United States Patent
Cho et al.

(10) Patent No.: US 9,060,284 B2
(45) Date of Patent: Jun. 16, 2015

(54) METHOD AND DEVICE FOR ESTIMATING AP POSITION USING A MAP OF A WIRELESS LAN RADIO ENVIRONMENT

(75) Inventors: Chae Hwan Cho, Gyeonggi-Do (KR); Chang Seok Lee, Seoul (KR); Suk Yon Kang, Seoul (KR); Seung Yoon Baek, Seoul (KR); Hye Min Lee, Gyeonggi-Do (KR)

(73) Assignee: SK TELECOM CO., LTD., Seoul (KR)

( * ) Notice: Subject to any disclaimer, the term of this patent is extended or adjusted under 35 U.S.C. 154(b) by 297 days.

(21) Appl. No.: 13/808,847

(22) PCT Filed: Jun. 28, 2011

(86) PCT No.: PCT/KR2011/004698
§ 371 (c)(1),
(2), (4) Date: Mar. 22, 2013

(87) PCT Pub. No.: WO2012/005465
PCT Pub. Date: Jan. 12, 2012

(65) Prior Publication Data
US 2013/0170383 A1 Jul. 4, 2013

(30) Foreign Application Priority Data

Jul. 8, 2010 (KR) .................. 10-2010-0065806
Aug. 19, 2010 (KR) .................. 10-2010-0080090

(51) Int. Cl.
*G08C 15/00* (2006.01)
*H04W 24/00* (2009.01)
*G01S 5/02* (2010.01)
*H04W 64/00* (2009.01)
*H04L 29/12* (2006.01)

(52) U.S. Cl.
CPC ............. *H04W 24/00* (2013.01); *G01S 5/0242* (2013.01); *G01S 5/0252* (2013.01); *H04W 64/003* (2013.01); *H04L 61/6022* (2013.01)

(58) Field of Classification Search
CPC ..................... G01S 5/0242; H04W 64/003
See application file for complete search history.

(56) References Cited

U.S. PATENT DOCUMENTS

| 2005/0176442 A1* | 8/2005 | Ju et al. ..................... 455/456.1 |
| 2005/0208952 A1* | 9/2005 | Dietrich et al. ............ 455/456.1 |
| 2008/0186933 A1* | 8/2008 | Willman et al. ............... 370/338 |
| 2009/0215465 A1* | 8/2009 | MacNaughtan et al. ... 455/456.1 |

FOREIGN PATENT DOCUMENTS

| KR | 10-2005-0034762 | 4/2005 |
| KR | 10-2008-0019593 | 3/2008 |
| KR | 10-2009-0063549 | 6/2009 |
| WO | 2007/056738 | 5/2007 |

OTHER PUBLICATIONS

International Search Report mailed Feb. 10, 2012 for PCT/KR2011/004698.

* cited by examiner

*Primary Examiner* — Huy D Vu
*Assistant Examiner* — Kevin Cunningham
(74) *Attorney, Agent, or Firm* — Lowe Hauptman & Ham, LLP

(57) ABSTRACT

The present disclosure concerns a method and apparatus for estimating AP position using WLAN radiowave environment map. An embodiment includes filter for generating filtering radiowave map with data selected exclusively for having common MAC address from collected WLAN radiowave environment maps; grid-cell divisor for generating grid radiowave map with arbitrary grid cells from dividing the filtering radiowave map; representative-coordinate mapper for calculating centroid of each of grid cells constituting grid radiowave map and mapping each centroid as representative coordinate to each grid cell; representative-signal-strength mapper for calculating representative signal strengths based on data in grid cell and mapping each representative signal strength to grid cell; weight-value sorter for sorting out weight value corresponding to a range covering representative signal strength as received; and position estimator for estimating positional information of APs having common MAC address based on one or more of representative coordinate, representative signal strength, and weight value.

37 Claims, 16 Drawing Sheets

*FIG. 7*

| 10 | 20 | 10 | 30 | 40 |
|---|---|---|---|---|
| 20 | 30 | 50 | 70 | 75 |
| 10 | 70 | 80 | 90 |  |
| 25 | 50 | 85 | 60 | 65 |
| 30 | 40 | 55 | 60 | 50 |

*FIG. 8*

| 10 | 20 | 10 | 30 | 40 |
|---|---|---|---|---|
| 20 | 30 | 50 | 70 | 75 |
| 10 | 70 | 80 | 90 |  |
| 25 | 50 | 85 | 60 | 65 |
| 30 | 40 | 55 | 60 | 50 |

*FIG. 10*

| | | | | |
|---|---|---|---|---|
| 10 | 20 | 10 | 30 | 40 |
| 20 | 30 | 50 | 70 | 75 |
| 10 | 70 | 80 | 90 | |
| 25 | 50 | 85 | 60 | 65 |
| 30 | 40 | 55 | 60 | 50 |

*FIG. 11*

| X1,Y1 ✕ | X2,Y2 ✕ | X3,Y3 ✕ | X4,Y4 ✕ | X5,Y5 ✕ |
|---|---|---|---|---|
| X6,Y6 ✕ | X7,Y7 ✕ | X8,Y8 ✕ | X9,Y9 ✕ | X10,Y10 ✕ |
| X11,Y11 ✕ | X12,Y12 ✕ | X13,Y13 ✕ | X14,Y14 ✕ | X15,Y15 ✕ |
| X16,Y16 ✕ | X17,Y17 ✕ | X18,Y18 ✕ | X19,Y19 ✕ | X20,Y20 ✕ |
| X21,Y21 ✕ | X22,Y22 ✕ | X23,Y23 ✕ | X24,Y24 ✕ | X25,Y25 ✕ |

*FIG. 12*

| 10 | 20 | 10 | 30 | 40 |
|----|----|----|----|----|
| 20 | 30 | 50 | 70 | 75 |
| 10 | 70 | 80 | 90 |    |
| 25 | 50 | 85 | 60 | 65 |
| 30 | 40 | 55 | 60 | 50 |

FIG. 13

| Received Signal Strength Range | Weight Value |
|---|---|
| 10 ~ 19 | W1 |
| 20 ~ 29 | W2 |
| 30 ~ 39 | W3 |
| 40 ~ 49 | W4 |
| 50 ~ 59 | W5 |
| 60 ~ 69 | W6 |
| 70 ~ 79 | W7 |
| 80 ~ 89 | W8 |
| 90 ~ 99 | W9 |

*FIG. 14*

| 10 | 20 | 10 | 30 | 40 |
|----|----|----|----|----|
| 20 | 30 | 50 | 70 | 75 |
| 10 | 70 | 80 | 90 |    |
| 25 | 50 | 85 | 60 | 65 |
| 30 | 40 | 55 | 60 | 50 |

*FIG. 16*

METHOD AND DEVICE FOR ESTIMATING AP POSITION USING A MAP OF A WIRELESS LAN RADIO ENVIRONMENT

TECHNICAL FIELD

The present disclosure relates in some aspects to a method and apparatus for estimating an AP position by using wireless LAN radiowave environment maps. More particularly, the present disclosure concerns a database containing position information of access points (APs) transmitting/receiving wireless LAN signals for positioning, and relates to a method and apparatus for estimating an AP position by using wireless LAN radiowave environment maps, in which data having a common MAC address in collected wireless LAN radiowave environment maps are matched with grid cells, and relevant AP positions are estimated based on coordinates of the respective grid cells and representative signal strengths, or in which data having a common MAC address in collected wireless LAN radiowave environment maps are matched with grid cells, and positions of APs having a common MAC address is estimated based on one or more pieces of information among coordinates of the respective grid cells, representative signal strengths, and weight values.

BACKGROUND

The statements in this section merely provide background information related to the present disclosure and may not constitute prior art.

With the rapid development of computer, electronic and communication technologies, a variety of wireless communication services based on wireless networks have been provided. Accordingly, services provided by mobile communication systems based on wireless communication networks have evolved from voice services to multimedia services that involve transmission of various data such as circuit data and packet data.

Among a variety of wireless Internet services using mobile communication terminals, a location based service (LBS) has attracted much attention due to the wide application and convenience thereof. LBS is a communication service that determines a location of a mobile communication terminal, such as a portable phone and a personal digital assistant (PDA), and provides additional information related to the determined location. Positioning technologies for providing the LBS may be classified into a network based positioning technology, a handset based positioning technology, and a hybrid positioning technology. Specifically, the network based positioning technology detects a location by way of software using a radiowave environment, which is a cell radius of a base station in a mobile communication network, in order to determine a location of a mobile communication terminal. The handset based positioning technology uses a Global Positioning System (GPS) receiver mounted on a mobile communication terminal in order to determine a location of a mobile communication terminal. The hybrid positioning technology is a combination of the network based positioning technology and the handset based positioning technology.

Meanwhile, in order for positioning by using wireless LAN signals, there is a need for position information of an AP installed in a wireless LAN radiowave environment map generated by collecting wireless LAN signals. However, when collecting a wireless LAN radiowave environment through a radiowave environment determination apparatus, certain areas with densely installed APs disorient the establishment of the radiowave environment map. Therefore, there is a need for technology that is capable of estimating an AP position recognized in the collected wireless LAN radiowave environment map.

DISCLOSURE

Technical Problem

Therefore, in order to solve the above-described problems, one or more embodiments of the present disclosure are directed to providing a method and apparatus for estimating an AP position by using wireless LAN radiowave environment maps, which are capable of estimating positions of APs transmitting/receiving wireless LAN signals for positioning, or capable of estimating positions of APs having a common MAC address by using collected wireless LAN radiowave environment information so as to determine AP positions by using the wireless LAN signals.

Summary

An embodiment of the present disclosure provides an apparatus for estimating an AP position by using a weighted average of signal strengths, including: a filtering unit for generating a filtering radiowave map with data selected exclusively for having a common MAC address from collected wireless LAN radiowave environment maps; a grid cell division unit for generating a grid radiowave map with arbitrary grid cells from dividing the filtering radiowave map; a representative coordinate mapping unit for calculating a centroid of each of the grid cells constituting the grid radiowave map, and mapping said each centroid as a representative coordinate to said each grid cell; a representative signal strength mapping unit for calculating representative signal strengths based on data existing in said each grid cell, and mapping each representative signal strength to said each grid cell; a weight value sorting unit for sorting out a weight value corresponding to a range covering a received signal strength of the representative signal strength; and a position estimation unit for estimating positional information of access points (APs) having a common MAC address based on one or more of the representative coordinate, the representative signal strength, and the weight value.

Another embodiment of the present disclosure provides an apparatus for estimating an AP position by using a weighted average of signal strengths, including: a filtering unit for generating a filtering radiowave map with data selected exclusively for having a common MAC address from collected wireless LAN radiowave environment maps; a grid cell division unit for generating a grid radiowave map with arbitrary grid cells from dividing the filtering radiowave map; a representative coordinate mapping unit for calculating a centroid of each of the grid cells constituting the grid radiowave map, and mapping said each centroid as a representative coordinate to said each grid cell; a representative signal strength mapping unit for calculating representative signal strengths based on data existing in said each grid cell, and mapping each representative signal strength to said each grid cell; a weight value sorting unit for sorting out a weight value corresponding to a range covering a received signal strength of the representative signal strength; and a position estimation unit for calculating a total weighted average coordinate value by multiplying the weight value by the representative coordinate mapped to each grid cell, and estimating the weighted average coordinate value as position information of APs having a common MAC address.

According to still another embodiment of the present disclosure provides an apparatus for estimating an AP position by using a weighted average of signal strengths, including: a filtering unit for generating a filtering radiowave map with data selected exclusively for having a common MAC address from collected wireless LAN radiowave environment maps; a grid cell division unit for generating a grid radiowave map with arbitrary grid cells from dividing the filtering radiowave map; a representative coordinate mapping unit for calculating a centroid of each of the grid cells constituting the grid radiowave map, and mapping said each centroid as a representative coordinate to said each grid cell; a representative signal strength mapping unit for calculating representative signal strengths based on data existing in said each grid cell, and mapping each representative signal strength to said each grid cell; a weight value sorting unit for sorting out a weight value corresponding to a range covering a received signal strength of the representative signal strength; a grid cell sorting unit for sorting out a grid cells having signal strength information of a preset threshold value or more among the representative signal strengths; and a position estimation unit for calculating a weighted average coordinate value by applying the weight value to the representative coordinate mapped to said each grid cell, and estimating the weighted average coordinate value as position information of APs having the common MAC address.

Yet another embodiment of the present disclosure provides a method for estimating an AP position by using a weighted average of signal strengths, including: generating a filtering radiowave map with data selected exclusively for having a common MAC address from collected wireless LAN radiowave environment maps; generating a grid radiowave map with arbitrary grid cells from dividing the filtering radiowave map; calculating a centroid of each of the grid cells constituting the grid radiowave map, and mapping said each centroid as a representative coordinate to said each grid cell; calculating representative signal strengths based on data existing in said each grid cell, and mapping each representative signal strength to said each grid cell; sorting out a weight value corresponding to a range covering a received signal strength of the representative signal strength; and estimating position information of APs having a common MAC address, based on one or more of the representative coordinate, the representative signal strength, and the weight value.

Yet another embodiment of the present disclosure provides a computer readable medium storing a computer program for causing, when executed in a processor, the processor to perform the steps of the above-described methods for estimating an AP position by using a weighted average of signal strengths.

Yet another embodiment of the present disclosure provides a method for estimating an AP position by using a weighted average of signal strengths, including: generating a filtering radiowave map with data selected exclusively for having a common MAC address from collected wireless LAN radiowave environment maps; generating a grid radiowave map with arbitrary grid cells from dividing the filtering radiowave map; calculating a centroid of each of the grid cells constituting the grid radiowave map, and mapping said each centroid as a representative coordinate to said each grid cell; calculating representative signal strengths based on data existing in said each grid cell, and mapping each representative signal strength to said each grid cell; sorting out a weight value corresponding to a range covering a received signal strength of the representative signal strength; and calculating a total weighted average coordinate value by multiplying each weight value by each representative coordinate mapped to said each grid cell, and estimating the total weighted average coordinate value as position information of APs having a common MAC address.

Yet another embodiment of the present disclosure provides a method for estimating an AP position by using a weighted average of signal strengths, including: generating a filtering radiowave map with data selected exclusively for having a common MAC address from collected wireless LAN radiowave environment maps; generating a grid radiowave map with arbitrary grid cells from dividing the filtering radiowave map; calculating a centroid of each of the grid cells constituting the grid radiowave map, and mapping said each centroid as a representative coordinate to said each grid cell; calculating representative signal strengths based on data existing in said each grid cell, and mapping each representative signal strength to said each grid cell; sorting out a weight value corresponding to a range covering a received signal strength of the representative signal strength; sorting out the grid cells having signal strength information of a preset threshold value or more among the representative signal strengths, and calculating a weighted average coordinate value by applying each weight value to each representative coordinate mapped to said each grid cell, and estimating the weighted average coordinate value as position information of APs having the common MAC address.

Yet another embodiment of the present disclosure provides an apparatus for estimating an AP position by using wireless LAN radiowave environment maps, including: a filtering unit for generating a filtering radiowave map with data selected exclusively for having a common MAC address from collected wireless LAN radiowave environment maps; a grid cell division unit for generating a grid radiowave map with arbitrary grid cells from dividing the filtering radiowave map; a representative coordinate mapping unit for calculating a centroid of each of the grid cells constituting the grid radiowave map, and mapping said each centroid as a representative coordinate to said each grid cell; a representative signal strength mapping unit for calculating representative signal strengths based on data existing in said each grid cell, and mapping each representative signal strength to said each grid cell; and a position estimation unit for estimating position information of APs having a common MAC address based on one or more of the representative coordinates and the representative signal strengths.

Yet another embodiment of the present disclosure provides an apparatus for estimating an AP position by using wireless LAN radiowave environment maps, including: a filtering unit for generating a filtering radiowave map with data selected exclusively for having a common MAC address from collected wireless LAN radiowave environment maps; a grid cell division unit for generating a grid radiowave map with arbitrary grid cells from dividing the filtering radiowave map; a representative coordinate mapping unit for calculating a centroid of each of the grid cells constituting the grid radiowave map, and mapping said each centroid as a representative coordinate to said each grid cell; and a position estimation unit for calculates a total weighted average coordinate value of the representative coordinates mapped to said each grid cell, and estimating the total weighted average coordinate value as the position information of the APs.

Yet another embodiment of the present disclosure provides an apparatus for estimating an AP position by using wireless LAN radiowave environment maps, including: a filtering unit for generating a filtering radiowave map with data selected exclusively for having a common MAC address from collected wireless LAN radiowave environment maps; a grid cell division unit for generating a grid radiowave map with arbitrary grid cells from dividing the filtering radiowave map; a representative coordinate mapping unit for calculating a centroid of each of the grid cells constituting the grid radiowave map, and mapping said each centroid as a representative coordinate to said each grid cell; a representative signal strength mapping unit for calculating representative signal strengths based on data existing in said each grid cell, and mapping each representative signal strength to said each grid cell; a grid cell sorting unit for sorting out the grid cells having signal strength information of a preset threshold value or more among the representative signal strengths; and a position estimation unit for estimating an average coordinate value of the representative coordinates mapped to each sorted grid cell, and estimating the average coordinate value as the position information of the APs.

Yet another embodiment of the present disclosure provides an apparatus for estimating an AP position by using wireless LAN radiowave environment maps, including: a filtering unit for generating a filtering radiowave map with data selected exclusively for having a common MAC address from collected wireless LAN radiowave environment maps; a grid cell division unit for generating a grid radiowave map with arbitrary grid cells from dividing the filtering radiowave map; a representative coordinate mapping unit for calculating a centroid of each of the grid cells constituting the grid radiowave map, and mapping said each centroid as a representative coordinate to said each grid cell; a representative signal strength mapping unit for calculating representative signal strengths based on data existing in said each grid cell, and mapping each representative signal strength to said each grid cell; and a position estimation unit for sorting out grid cells having maximum signal strength information among the representative signal strengths, and estimating the representative coordinate of the sorted grid cell as the position information of the APs.

Yet another embodiment of the present disclosure provides an apparatus for estimating an AP position by using wireless LAN radiowave environment maps, including: generating a filtering radiowave map with data selected exclusively for having a common MAC address from collected wireless LAN radiowave environment maps; generating a grid radiowave map with arbitrary grid cells from dividing the filtering radiowave map; calculating a centroid of each of the grid cells constituting the grid radiowave map, and mapping said each centroid as a representative coordinate to said each grid cell; calculating representative signal strengths based on data existing in said each grid cell, and mapping each representative signal strength to said each grid cell; and estimating position information of APs having a common MAC address based on one or more of the representative coordinates and the representative signal strengths.

Yet another embodiment of the present disclosure provides a method for estimating an AP position by using wireless LAN radiowave environment maps, including: generating a filtering radiowave map with data selected exclusively for having a common MAC address from collected wireless LAN radiowave environment maps; generating a grid radiowave map with arbitrary grid cells from dividing the filtering radiowave map; calculating a centroid of each of the grid cells constituting the grid radiowave map, and mapping said each centroid as a representative coordinate to said each grid cell; and estimating a total average coordinate value of the representative coordinates mapped to each grid cell, and estimating the total average coordinate value as the position information of the APs.

Yet another embodiment of the present disclosure provides a method for estimating an AP position by using wireless LAN radiowave environment maps, including: generating a filtering radiowave map with data selected exclusively for having a common MAC address from collected wireless LAN radiowave environment maps; generating a grid radiowave map with arbitrary grid cells from dividing the filtering radiowave map; calculating a centroid of each of the grid cells constituting the grid radiowave map, and mapping said each centroid as a representative coordinate to said each grid cell; calculating representative signal strengths based on data existing in said each grid cell, and mapping each representative signal strength to said each grid cell; sorting out the grid cells having signal strength information of a preset threshold value or more among the representative signal strengths; and estimating an average coordinate value of the representative coordinates mapped to each sorted grid cell, and estimating the average coordinate value as the position information of the APs.

Yet another embodiment of the present disclosure provides a method for estimating an AP position by using wireless LAN radiowave environment maps, including: generating a filtering radiowave map with data selected exclusively for having a common MAC address from collected wireless LAN radiowave environment maps; generating a grid radiowave map with arbitrary grid cells from dividing the filtering radiowave map; calculating a centroid of each of the grid cells constituting the grid radiowave map, and mapping said each centroid as a representative coordinate to said each grid cell; calculating representative signal strengths based on data existing in said each grid cell, and mapping each representative signal strength to said each grid cell; and sorting out a grid cell having maximum signal strength information among the representative signal strengths, and estimating a representative coordinate of the sorted grid cell as the position information of the APs.

Advantageous Effects

According to one or more embodiments of the present disclosure as described above, it is possible to establish a database that contains position estimation information of APs transmitting/receiving wireless LAN signals for positioning. In addition, according to one or more embodiments of the present disclosure, positioning using wireless LAN signals can be realized by establishing a database by estimating position information of APs having a common MAC address, even when the position information of the APs is not obtained in wireless LAN radiowave environment maps from which the wireless LAN signals are collected. Therefore, the accuracy of the positioning using the wireless LAN signals can be improved. Moreover, according to one or more embodiments of the present disclosure, data having a common MAC address in collected wireless LAN radiowave environment maps are matched with grid cells, and relevant AP positions can be accurately estimated based on one or more of coordinates of the respective grid cells, representative signal strengths, and weight values.

According to one or more embodiments of the present disclosure, it is possible to establish a database that contains position estimation information of APs transmitting/receiving wireless LAN signals for positioning. In addition, according to one or more embodiments of the present disclosure, positioning using wireless LAN signals can be realized by establishing a database by estimating position information of APs, even when the position information of the APs is not obtained in wireless LAN radiowave environment maps from which the wireless LAN signals are collected. Therefore, the accuracy of the positioning using the wireless LAN signals can be improved. Moreover, according to one or more embodiments of the present disclosure, data having a common MAC address in collected wireless LAN radiowave environment maps are matched with grid cells, and relevant AP positions can be accurately estimated based on coordinates of the respective grid cells and representative signal strengths.

DESCRIPTION OF DRAWINGS

FIG. 7 is an exemplary diagram showing a process of mapping a representative coordinate to a grid radiowave map according to one or more embodiments of the present disclosure;

FIG. 8 is an exemplary diagram showing a process of mapping a representative signal strength to a grid radiowave map according to one or more embodiment of the present disclosure;

FIG. 10 is an exemplary diagram showing a process of estimating an AP position by using a representative signal strength according to one or more embodiments of the present disclosure;

FIG. 11 is an exemplary diagram showing a process of estimating an AP position by using a maximum signal strength according to one or more embodiment of the present disclosure;

FIG. 12 is an exemplary diagram showing a process of mapping a representative coordinate to a grid radiowave map according to one or more embodiments of the present disclosure;

FIG. 13 is an exemplary diagram showing a process of mapping a representative signal strength to a grid radiowave map according to one or more embodiment of the present disclosure;

FIG. 14 is an exemplary diagram showing a weight value corresponding to a range covering a received signal strength according to one or more embodiments of the present disclosure;

FIG. 16 is an exemplary diagram showing a method for estimating an AP position by applying a weight value to a sorted representative signal strength according to one or more embodiments of the present disclosure.

DESCRIPTION OF REFERENCE NUMERALS

Figure 1:
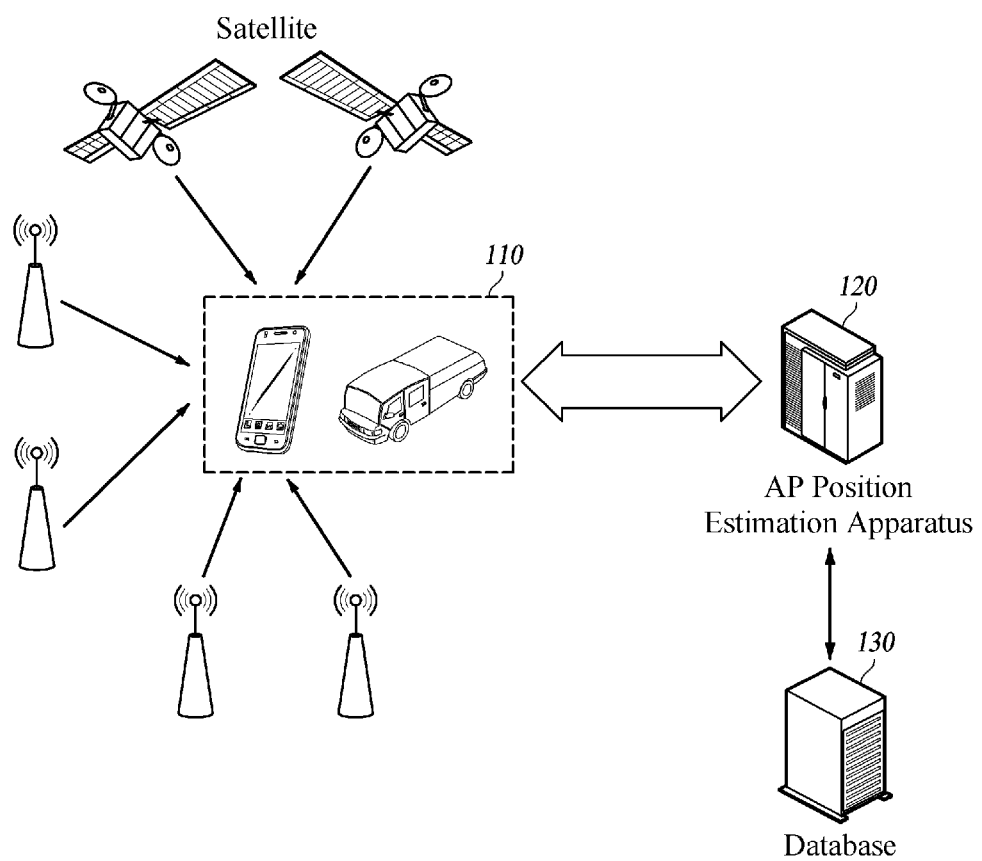
FIG. 1 is a block diagram schematically showing a system for estimating an AP position by using wireless LAN radiowave environment maps according to one or more embodiments of the present disclosure.

110: radiowave environment collection apparatus
120: AP position estimation apparatus
130: database
210: wireless LAN radiowave environment reception unit
220: filtering unit
230: grid cell division unit
240: representative coordinate mapping unit
250: representative signal strength mapping unit
260: position estimation unit
270: grid cell sorting unit
290: weight value sorting unit
292: position estimation unit
294: grid cell sorting unit

DETAILED DESCRIPTION

Hereinafter, embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

The term 'wireless LAN radiowave environment maps' as used herein refers to radiowave environment maps generated by collecting wireless LAN radiowave environment information and position information followed by matching and storing them. The term 'filtering radiowave map' as used herein refers to a radiowave environment map generated with data selected exclusively for having a common MAC address from collected wireless LAN radiowave environment maps. In addition, the term 'grid radiowave map' as used herein refers to a radiowave environment map generated with arbitrary grid cell divisions from the filtering radiowave map. The term 'MAC address' as used herein refers to a Basic Service Set IDentifier (BSSID) as unique information capable of identifying APs.

FIG. 1 is a block diagram schematically showing a system for estimating an AP position by using wireless LAN radiowave environment maps according to one or more embodiments of the present disclosure.

A system for estimating an AP position by using wireless LAN radiowave environment maps according to one or more embodiments of the present disclosure includes a radiowave environment collection apparatus 110, an AP position estimation apparatus 120, and a database 130. Meanwhile, the system for estimating the AP position by using the wireless LAN radiowave environment maps according to one or more embodiments of the present disclosure is described as exclusively including the radiowave environment collection apparatus 110, the AP position estimation apparatus 120, and the data base 130 not by way of limitation and by way of illustration of the technical spirit of one or more embodiments of the present disclosure. It is apparent to those skilled in the art that elements included in the system for estimating the AP position by using the wireless LAN radiowave environment maps can be modified and changed in various forms, without departing from essential characteristics of one embodiment of the present disclosure.

The radiowave environment collection apparatus 110 refers to any type of apparatuses capable of collecting radiowave environments. The radiowave environment collection apparatus 110 according to one or more embodiments of the present disclosure may be widely applied to mobile communication terminals and vehicles mounted with a separate radiowave environment collecting unit, but the present disclosure is not necessarily limited thereto. That is, the radiowave environment collection apparatus 110 may be implemented with a separate device for measuring radiowaves, excluding a typical voice call. Meanwhile, in the case where the radiowave environment collection apparatus 110 can interwork with the mobile communication network, the radiowave environment collection apparatus 110 may transmit base station information of interworking base stations to the AP position estimation apparatus 120.

That is, the radiowave environment collection apparatus 110 is an apparatus mounted with a wireless LAN module and is a terminal that can connect to an Internet network through a detected AP by using the mounted wireless LAN module and receive a variety of webpage data. The AP is a device for making connections of data communication. Specifically, the AP is a device that can read an address of a receiving side from information of a transmitting side, designate an optimal communication path, and transmit data to other communication network. That is, the AP may extract a position of a data packet, designate an optimal communication path of the extracted position of the data packet, and transmit the data packet to other device through the designated communication path. In addition, the AP may share a plurality of communication lines under the general network environments. In this embodiment, the AP may be used in concept as encompassing a router, a repeater, a relay, and a bridge. In addition, the radiowave environment collection apparatus 110 is a terminal mounted with a GPS module. The radiowave environment collection apparatus 110 extracts navigation data from GPS radiowave signals received from one or more GPS satellites, and transmits the extracted navigation data to the AP position estimation apparatus 120 through the mobile communication network.

In the case where the radiowave environment collection apparatus 110 is a mobile communication terminal, the mobile communication terminal is a terminal mounted with a wireless communication module for performing a typical voice call and data communication. Apart from the typical voice call and data communication, the radiowave environment collection apparatus 110 may collect a call environment and transmit the collected call environment to the AP position estimation apparatus 120. The mobile communication terminal may be any one of a smart phone, a personal computer (PC), a notebook computer, and a personal digital assistant (PDA), each of which is mounted with a wireless communication module, a GPS module, and a wireless LAN module. The mobile communication terminal refers to a terminal that includes a memory for storing application software for use in LBS, a microprocessor for executing and controlling a program, and the like.

The AP position estimation apparatus 120 estimates positions of APs transmitting/receiving wireless LAN signals by using wireless LAN radiowave environment maps collected by the radiowave environment collection apparatus 110, and stores the estimated position information of the APs in the database 130. The position information of the APs includes one or more of latitude information, longitude information, and altitude information.

The AP position estimation apparatus 120 generates a filtering radiowave map with data selected exclusively for having a common MAC address from wireless LAN radiowave environment maps collected by the radiowave environment collection apparatus 110. The AP position estimation apparatus 120 receives wireless LAN radiowave environment maps collected through one or more of a field survey device, a mobile communication terminal, and an external server. The AP position estimation apparatus 120 does not necessarily receive the wireless LAN radiowave environment maps collected by the radiowave environment collection apparatus 110, and may also receive wireless LAN radiowave environment maps collected by the interworking external server. The wireless LAN radiowave environment maps are one or more of identification information (SSID) of APs for transmitting/receiving wireless LAN signals, MAC address information (BSSID), received signal strength indication information (RSSI), and frequency information (channel) which are information of a wireless LAN radiowave environment, after matching with positional information of collecting the wireless LAN radiowave environment. The AP position estimation apparatus 120 generates a grid radiowave map with arbitrary grid cells from dividing the filtering radiowave map, and calculates a centroid of each of the grid cells constituting the grid radiowave map.

The AP position estimation apparatus 120 maps each centroid as a representative coordinate to each grid cell constituting the grid wave radiowave map. The AP position estimation apparatus 120 calculates the representative signal strength based on data existing in each grid cell constituting the grid radiowave map, and maps each representative signal strength to each grid cell. When the number of the data existing in each grid cell exceeds a preset threshold value, the AP position estimation apparatus 120 calculates a deviation value between maximum signal strength and minimum signal strength among all pieces of signal strength information contained in the data. When the deviation value exceeds a preset strength, the AP position estimation apparatus 120 recognizes an average value of signal strengths, other than the maximum signal strength and the minimum signal strength among all pieces of the signal strength information, as representative signal strength. When the number of the data existing in each grid cell is two or more, the AP position estimation apparatus 120 recognizes an average value of signal strength information contained in the two data as representative signal strength. When the number of the data existing in each grid cell is single, the AP position estimation apparatus 120 recognizes signal strength contained in the single data as a representative signal strength.

The AP position estimation apparatus 120 estimates position information of APs having a common MAC address based on the representative coordinate and the representative signal strength. The AP position estimation apparatus 120 calculates a total average coordinate value of the representative coordinate mapped to each grid cell, and estimates the total average coordinate value as the position information of the AP. The AP position estimation apparatus 120 sums X-coordinate values of the representative coordinates as many as the number of the grid cells, and calculates an average X-coordinate value by dividing the sum of the X-coordinate values by the number of the grid cells. The AP position estimation apparatus 120 sums Y-coordinate values of the representative coordinates as many as the number of the grid cells, and calculates an average Y-coordinate value by dividing the sum of the Y-coordinate values by the number of the grid cells. The average X-coordinate value and the average Y-coordinate value are taken and recognized as the total average coordinate value. The process of calculating the average X-coordinate value and the average Y-coordinate value is expressed as Equation 1 below.

$$X\text{-coordinate value} = \frac{(X1 + X2 + X3 + \ldots Xn)}{n}$$
$$Y\text{-coordinate value} = \frac{(Y1 + Y2 + Y3 + \ldots Yn)}{n}$$

Equation 1

The AP position estimation apparatus 120 sorts out grid cells having signal strength information of the preset threshold value or more among the representative signal strengths, calculates the average coordinate value of the representative coordinates mapped to each sorted grid cell, and estimates the average coordinate value as the position information of the APs. The AP position estimation apparatus 120 sums X-coordinate values of the representative coordinates, which are mapped to each sorted grid cell, as many as the number of the sorted grid cells, and calculates an average X-coordinate value by dividing the sum of the X-coordinate values by the number of the sorted grid cells. The AP position estimation apparatus 120 sums Y-coordinate values of the representative coordinates, which are mapped to each sorted grid cell, as many as the number of the sorted grid cells, and calculates an average Y-coordinate value by dividing the sum of the Y-coordinate values by the number of the sorted grid cells. The average X-coordinate value and the average Y-coordinate value are taken and recognized as the total average coordinate value. The AP position estimation apparatus 120 sorts out a grid cell having the maximum signal strength information among the representative signal strengths, and estimates the representative coordinate of the sorted grid cell as the position information of the APs.

The AP position estimation apparatus 120 according to one or more embodiment of the present disclosure generates a filtering radiowave map with data selected exclusively for having the common MAC address from the wireless LAN radiowave environment maps collected by the radiowave environment collection apparatus 110. The AP position estimation apparatus 120 receives the wireless LAN radiowave environment maps collected through one or more of a field survey device, a mobile communication terminal, and an external server. The AP position estimation apparatus 120 does not necessarily receive the wireless LAN radiowave environment maps collected by the radiowave environment collection apparatus 110, but may also receive the wireless LAN radiowave environment maps collected by the external server. The wireless LAN radiowave environment maps are one or more of identification information (SSID) of the APs for transmitting/receiving the wireless LAN signals, MAC address information (BSSID), received signal strength indication information (RSSI) and frequency information (channel) which are information of a wireless LAN radiowave environment, after matching with positional information of collecting the wireless LAN radiowave environment. The AP position estimation apparatus 120 generates the grid radiowave map with arbitrary grid cells from dividing the filtering radiowave map, and calculates a centroid of each of the grid cells constituting the grid radiowave map.

The AP position estimation apparatus 120 maps each centroid as a representative coordinate to each of the grid cells constituting the grid radiowave map. The AP position estimation apparatus 120 calculates representative signal strength based on data existing in each grid cell constituting the grid radiowave map, and maps each representative signal strength to each grid cell. When the number of the data existing in each grid cell exceeds a preset threshold value, the AP position estimation apparatus 120 calculates a deviation value between maximum signal strength and minimum signal strength among all pieces of signal strength information contained in the data. When the deviation value exceeds a preset strength, the AP position estimation apparatus 120 recognizes an average value of signal strengths, other than the maximum signal strength and the minimum signal strength among all pieces of the signal strength information, as a representative signal strength. When the number of the data existing in each grid cell is two or more, the AP position estimation apparatus 120 recognizes an average value of signal strength information contained in the two data as a representative signal strength. When the number of the data existing in each grid cell is single, the AP position estimation apparatus 120 recognizes signal strength contained in the single data as a representative signal strength.

The AP position estimation apparatus 120 sorts out a weight value corresponding to a range covering received signal strength of the representative signal strength. The weight value is matched with a preset specific value according to the received signal strength of the representative signal strength. As the received signal strength of the representative signal strength is higher, the preset specific value may have a larger weight value, but the present disclosure is not limited thereto.

The AP position estimation apparatus 120 estimates position information of APs having a common MAC address based on one or more of the representative coordinate, the representative signal strength, and the weight value. The AP position estimation apparatus 120 calculates a total weighted average coordinate value by multiplying the weight values by the representative coordinate mapped to each grid cell, and estimates the total weighted average coordinate value as the position information of the APs. The AP position estimation apparatus 120 multiplies X-coordinate values of the representative coordinates by each weight value, sums the products as many as the number of the grid cells, and calculates a weighted average X-coordinate value by dividing the sum of the products by the sum of the weight values. The AP position estimation apparatus 120 multiplies Y-coordinate values of the representative coordinates by each respective weight value, sums the products as many as the number of the grid cells, and calculates a weighted average Y-coordinate value by dividing the sum of the products by the sum of the weight values. The average X-coordinate value and the average Y-coordinate value are taken and recognized as the total weighted average coordinate value. The process of calculating the weighted average X-coordinate value and the weighted average Y-coordinate value is expressed as Equation 2 below.

$$X\text{-coordinate value} = $$
$$\frac{(X1 \times R1 + X2 \times R2 + X3 \times R3 + \ldots Xn \times Rn)}{R1 + R2 + R3 + \ldots Rn}$$
$$Y\text{-coordinate value} = $$
$$\frac{(Y1 \times R1 + Y2 \times R2 + Y3 \times R3 + \ldots Yn \times Rn)}{R1 + R2 + R3 + \ldots Rn}$$

Equation 2

In Equation 2 above, X denotes an X-coordinate value, Y denotes a Y-coordinate value, and R denotes a weight value.

In addition, the AP position estimation apparatus 120 sorts out grid cells having signal strength information of the preset threshold value or more among the representative signal strengths, calculates the weighted average coordinate value by multiplying the weight values by the representative coordinates mapped to each sorted grid cell, and estimates the weighted average coordinate value as the position information of the APs. The AP position estimation apparatus 120 multiplies each weight value by each representative coordinate mapped to each sorted grid cell, sums the products as many as the number of the sorted grid cells, and calculates a weighted average X-coordinate value by dividing the sum of the products by the sum of the weight values corresponding to the sorted grid cells. The AP position estimation apparatus 120 multiplies each weight value by each representative coordinate mapped to each sorted grid cell, sums the products as many as the number of the sorted grid cells, and calculates a weighted average Y-coordinate value by dividing the sum of the products by the sum of the weight values corresponding to the sorted grid cells. The weighted average X-coordinate value and the weighted average Y-coordinate value are taken and recognized as a weighted average coordinate value. The process of calculating the weighted average X-coordinate value and the weighted average Y-coordinate value is expressed as Equation 2 above.

The database 130 according to one or more embodiments of the present disclosure separately stores positioning result data, which are the positioning result obtained at each time, in the arbitrary grid cells, and also stores the wireless LAN radiowave environment information matchingly into the grid cells. In addition, the database 130 according to one or more embodiments of the present disclosure stores the wireless LAN radiowave environment map, the filtering radiowave map, the grid radiowave map, and representative coordinates mapped to each of the grid cells constituting the grid radiowave map, and representative signal strengths mapped to each of the grid cells constituting the grid radiowave map.

The term 'wireless LAN radiowave environment information' as used herein refers to information which is capable of recognizing the APs relaying the wireless LAN signals. The wireless LAN radiowave environment information may be MAC addresses of the APs relaying the wireless LAN signals, but the present disclosure is not necessarily limited thereto. The term 'MAC address' as used herein refers to a Basic Service Set IDentifier (BSSID), which is unique information capable of recognizing the relevant AP. The MAC address may be assigned a total of 48 bits, and information allocated by a manufacturer is input to 24 bits of the MAC address. A Service Set IDentifier (SSID) is information that is capable of recognizing the relevant AP, and represents a value set by a user.

The database 130 refers to a general data structure implemented in a storage space (hard disk or memory) of a computer system by using a database management program (DBMS). The database 130 refers to a type of data storage that can freely search (extract), delete, edit, and add data. The database 130 may be implemented to achieve the object of one or more embodiments of the present disclosure by using a relational database management system (RDBMS), such as Oracle, Infomix, Sybase, and DB2, an object-oriented database management system (OODBMS), such as Gemston, Orion, and O2, and an XML native database, such as Excelon, Tamino, and Sekaiju. The database 130 includes appropriate fields or elements so as to achieve its own function.

The database 130 shown in FIG. 1 is described as being implemented with a device provided separately from the AP position estimation apparatus 120, but the present disclosure is not necessarily limited thereto. For example, the database 130 may be implemented within the AP position estimation apparatus 120. Meanwhile, the grid cells are provided by dividing a specific area in a preset size. That is, the grid cell may be set to an N×M size. For example, the grid cell may be set in a square form, such as 100×100, 50×50, 30×30, 25×25, 20×20, 10×10, 5×5, and 1×1, but the present disclosure is not necessarily limited thereto. The grid cell may be set in various forms suitable for each environment through a subsequent optimization process.

Figure 2:
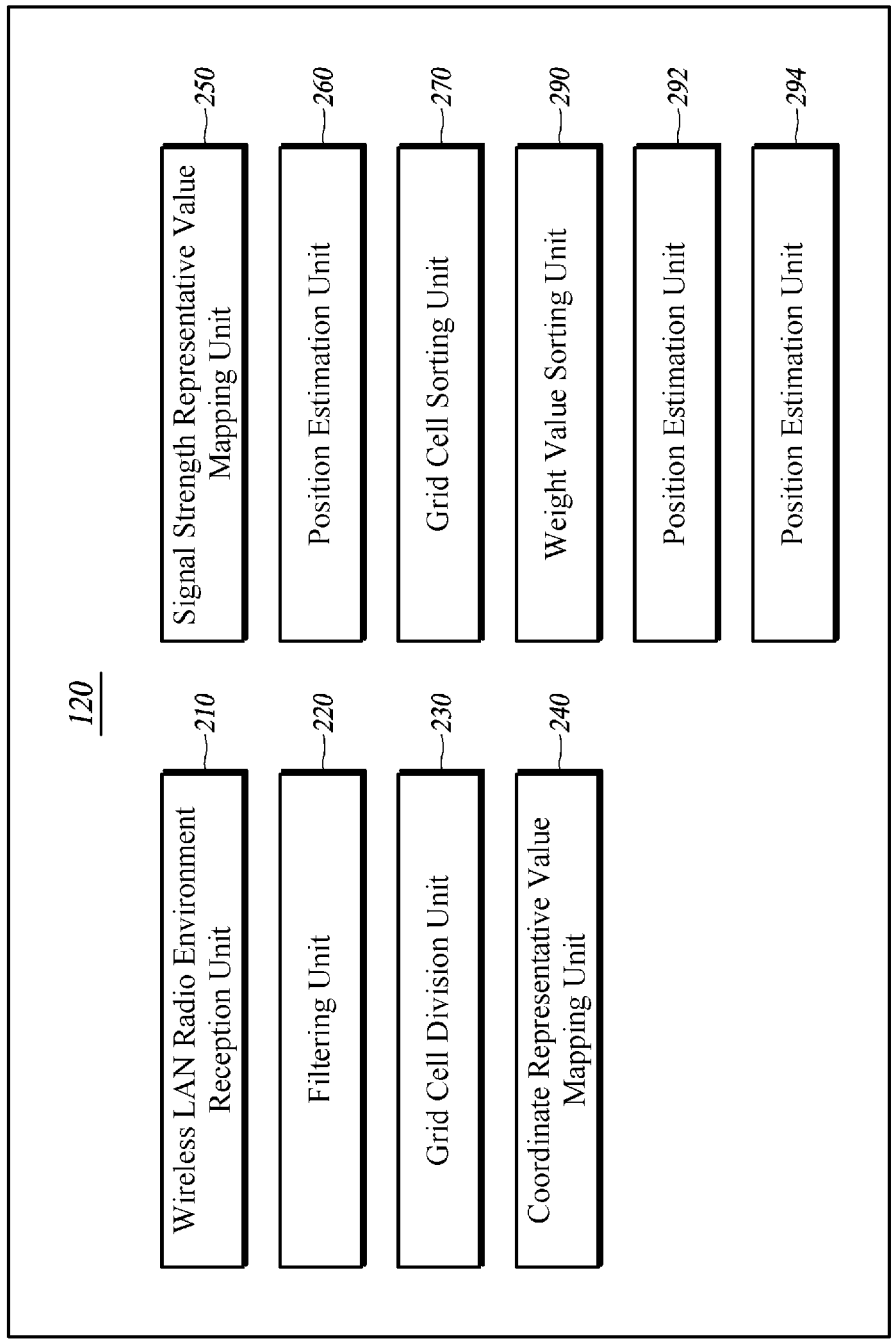
FIG. 2 is a block diagram schematically showing an apparatus for estimating an AP position according to one or more embodiments of the present disclosure.

FIG. 2 is a block diagram schematically showing an AP position estimation apparatus according to one or more embodiments of the present disclosure.

The AP position estimation apparatus 120 according to one or more embodiments of the present disclosure includes a wireless LAN radiowave environment reception unit 210, a filtering unit 220, a grid cell division unit 230, a representative coordinate mapping unit 240, a representative signal strength mapping unit 250, a weight value sorting unit 290, a position estimation unit 292, and a grid cell sorting unit 294. Meanwhile, the AP position estimation apparatus 120 according to one or more embodiments of the present disclosure is described as exclusively including the wireless LAN radiowave environment reception unit 210, the filtering unit 220, the grid cell division unit 230, the representative coordinate mapping unit 240, the representative signal strength mapping unit 250, the weight value sorting unit 290, the position estimation unit 292, and the grid cell sorting unit 294 merely by way of illustration of the technical spirit of one or more embodiments of the present disclosure. It is apparent to those skilled in the art that elements included in the AP position estimation apparatus 120 can be modified and changed in various forms, without departing from essential characteristics of one embodiment of the present disclosure.

The wireless LAN radiowave environment reception unit 210 functions to receive the wireless LAN radiowave environment maps collected through one or more of a field survey device, a mobile communication terminal, and an external server. The wireless LAN radiowave environment maps are one or more of identification information of the APs for transmitting/receiving the wireless LAN signals, MAC address information, received signal strength indication information, and frequency information which are information of a wireless LAN radiowave environment, after matching with positional information of collecting the wireless LAN radiowave environment.

The filtering unit 220 generates a filtering radiowave map with data selected exclusively for having a common MAC address from the collected wireless LAN radiowave environment maps. The grid cell division unit 230 generates a grid radiowave map with arbitrary grid cells from dividing the filtering radiowave map. The representative coordinate mapping unit 240 calculates a centroid of each of the grid cells constituting the grid radiowave map, and maps each centroid as a representative coordinate to each grid cell.

The representative signal strength mapping unit 250 calculates representative signal strengths based on data existing in each grid cell, and maps each representative signal strength to each grid cell. When the number of the data existing in each grid cell exceeds a preset threshold value, the representative signal strength mapping unit 250 calculates a deviation value between maximum signal strength and minimum signal strength among all pieces of signal strength information contained in the data. When the deviation value exceeds a preset strength, the representative signal strength mapping unit 250 recognizes an average value of signal strengths, other than the maximum signal strength and the minimum signal strength among all pieces of the signal strength information, as the representative signal strength. When the number of the data existing in each grid cell is two or more, the representative signal strength mapping unit 250 recognizes an average value of signal strength information contained in the two data as the representative signal strength. When the number of the data existing in each grid cell is single, the representative signal strength mapping unit 250 recognizes signal strength contained in the single data as the representative signal strength.

The position estimation unit 260 estimates position information of APs having a common MAC address based on the representative coordinate and the representative signal strength. The position estimation unit 260 calculates a total average coordinate value of the representative coordinates mapped to each grid cell, and estimates the total average coordinate value as the position information of the APs. The position estimation unit 260 sums X-coordinate values of the representative coordinates as many as the number of the grid cells, and calculates an average X-coordinate value by dividing the sum of the X-coordinate values by the number of the grid cells. The position estimation unit 260 sums Y-coordinate values of the representative coordinates as many as the number of the grid cells, and calculates an average Y-coordinate value by dividing the sum of the Y-coordinate values by the number of the grid cells. The average X-coordinate value and the average Y-coordinate value are taken and recognized as the total average coordinate value. The position estimation unit 260 calculates an average coordinate value of the representative coordinates mapped to each grid cell sorted by the grid cell sorting unit 270, and estimates the average coordinate value as the position information of the APs. The position estimation unit 260 sums X-coordinate values of the representative coordinates, which are mapped to each the sorted grid cell, as many as the number of the sorted grid cells, and calculates an average X-coordinate value by dividing the sum of the X-coordinate values by the number of the sorted grid cells. The position estimation unit 260 sums Y-coordinate values of the representative coordinates, which are mapped to each sorted grid cell, as many as the number of the sorted grid cells, and calculates an average Y-coordinate value by dividing the sum of the Y-coordinate values by the number of the sorted grid cells. The average X-coordinate value and the average Y-coordinate value are taken and recognized as the total average coordinate value. The position estimation unit 260 sorts out a grid cell having maximum signal strength information among the representative signal strengths, and estimates the representative coordinate of the sorted grid cell as the position information of the APs. Meanwhile, the grid cell sorting unit 270 sorts out the grid cells having signal strength information of a preset threshold value or more among the representative signal strengths.

The weight value sorting unit 290 sorts out a weight value corresponding to a range covering a received signal strength of the representative signal strength. The weight value is matched with a preset specific value according to the received signal strength of the representative signal strength. As the received signal strength of the representative signal strength is higher, the preset specific value may have a larger weight value, but the present disclosure is not limited thereto.

The position estimation unit 292 estimates position information of APs having a common MAC address based on one or more of the representative coordinate, the representative signal strength, and the weight value. The position estimation unit 292 calculates a total weighted average coordinate value by multiplying the weight values by the representative coordinates mapped to each grid cell, and estimates the total weighted average coordinate value as the position information of the APs. The position estimation unit 292 multiplies X-coordinate values of the representative coordinates by each weight value, sums the products as many as the number of the grid cells, and calculates a weighted average X-coordinate value by dividing the sum of the products by the sum of the weight values. The position estimation unit 292 multiplies Y-coordinate values of the representative coordinates by each weight value, sums the products as many as the number of the grid cells, and calculates a weighted average Y-coordinate value by dividing the sum of the products by the sum of the weight values. The average X-coordinate value and the average Y-coordinate value are taken and recognized as a total weighted average coordinate value.

The position estimation unit 292 calculates a weighted average coordinate value of the representative coordinates mapped to each grid cell sorted out by the grid cell sorting unit 294, and estimates the weighted average coordinate value as the position information of APs having the common MAC address. The position estimation unit 292 multiplies the respective weight values by each representative coordinate mapped to each grid cell sorted out by the grid cell sorting unit 294, sums the products as many as the number of the sorted grid cells, and calculates a weighted average X-coordinate value by dividing the sum of the products by the sum of the weight values corresponding to the sorted grid cells. The position estimation unit 292 multiplies the respective weight values by each representative coordinate mapped to each sorted grid cell, sums the products as many as the number of the sorted grid cells, and calculates a weighted average Y-coordinate value by dividing the sum of the products by the sum of the weight values corresponding to the sorted grid cells. The weighted average X-coordinate value and the weighted average Y-coordinate value are taken and recognized as a weighted average coordinate value. Meanwhile, the grid cell sorting unit 292 sorts out the grid cells having the signal strength information of the preset threshold value or more among the representative signal strengths.

Figure 3:
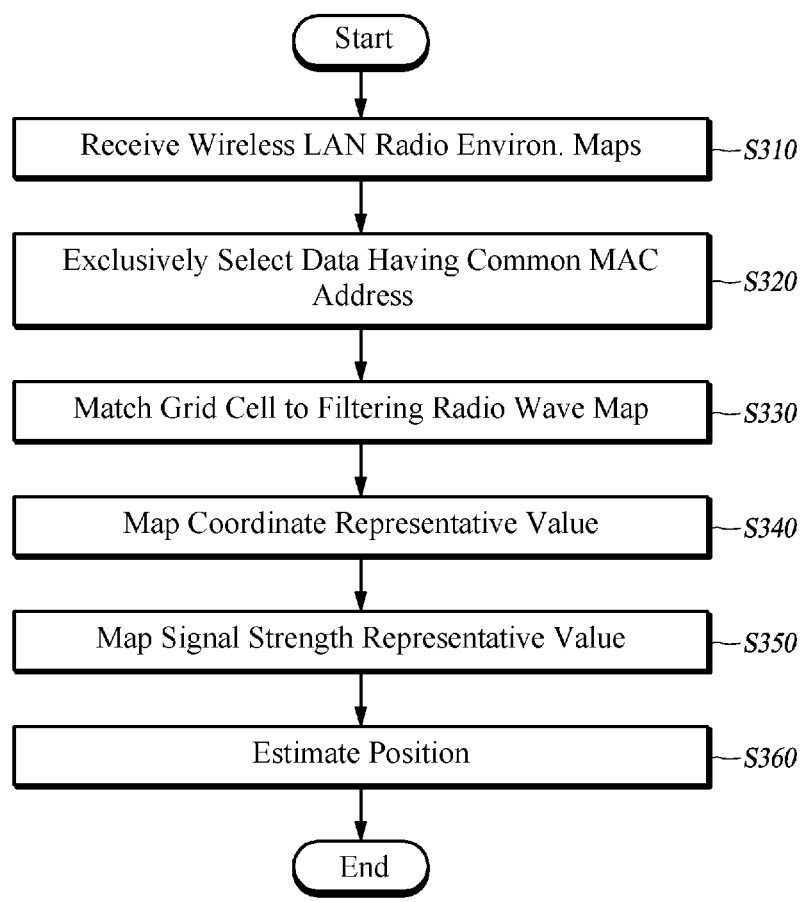
FIG. 3 is a flow chart describing a method for estimating an AP position by using wireless LAN radiowave environment maps according to one or more embodiments of the present disclosure.

FIG. 3 is a flow chart describing a method for estimating an AP position by using wireless LAN radiowave environment maps according to one or more embodiments of the present disclosure.

An AP position estimation apparatus 120 receives wireless LAN radiowave environment maps collected through one or more of a field survey device, a mobile communication terminal, and an external server (step S310). The AP position estimation apparatus 120 generates a filtering radiowave map with data selected exclusively for having a common MAC address from wireless LAN radiowave environment maps collected by a radiowave environment collection apparatus 110 (step S320). The AP position estimation apparatus 120 does not necessarily receive the wireless LAN radiowave environment maps collected by the radiowave environment collection apparatus 110, but may also receive wireless LAN radiowave environment maps collected by an external server. In addition, the wireless LAN radiowave environment maps are one or more of identification information of APs for transmitting/receiving wireless LAN signals, MAC address information, received signal strength indication information, and frequency information which are information of a wireless LAN radiowave environment, after matching with positional information of collecting the wireless LAN radiowave environment.

The AP position estimation apparatus 120 generates a grid radiowave map with arbitrary grid cells from dividing the filtering radiowave map (step S330). The AP position estimation apparatus 120 calculates a centroid of each of the grid cells constituting the grid radiowave map (step S340). The AP position estimation apparatus 120 maps each centroid as a representative coordinate to each grid cell constituting the grid radiowave map (step S350). The AP position estimation apparatus 120 calculates representative signal strengths based on data existing in each grid cell constituting the grid radiowave map, and maps each representative signal strength to each grid cell. When the number of the data existing in each grid cell exceeds a preset threshold value, the AP position estimation apparatus 120 calculates a deviation value between maximum signal strength and minimum signal strength among all pieces of signal strength information contained in the data. When the deviation value exceeds a preset strength, the AP position estimation apparatus 120 recognizes an average value of signal strengths, other than the maximum signal strength and the minimum signal strength among all pieces of the signal strength information, as the representative signal strength. When the number of the data existing in each grid cell is two or more, the AP position estimation apparatus 120 recognizes an average value of signal strength information contained in the two data as the representative signal strength. When the number of the data existing in each grid cell is single, the AP position estimation apparatus 120 recognizes signal strength contained in the single data as the representative signal strength.

The AP position estimation apparatus 120 estimates position information of APs having a common MAC address based on the representative coordinate and the representative signal strength (step S360). The AP position estimation apparatus 120 calculates a total average coordinate value of the representative coordinates mapped to each grid cell, and estimates the total average coordinate value as the position information of the APs. The AP position estimation apparatus 120 sums X-coordinate values of the representative coordinates as many as the number of the grid cells, and calculates an average X-coordinate value by dividing the sum of the X-coordinate values by the number of the grid cells. The AP position estimation apparatus 120 sums Y-coordinate values of the representative coordinates as many as the number of the grid cells, and calculates an average Y-coordinate value by dividing the sum of the Y-coordinate values by the number of the grid cells. The average X-coordinate value and the average Y-coordinate value are taken and recognized as the total average coordinate value. The AP position estimation apparatus 120 sorts out the grid cells having signal strength information of the preset threshold value or more among the representative signal strengths, calculates the average coordinate value of the representative coordinates mapped to each sorted grid cell, and estimates the average coordinate value as the position information of the APs. The AP position estimation apparatus 120 sums X-coordinate values of the representative coordinates, which are mapped to each sorted grid cell, as many as the number of the sorted grid cells, and calculates an average X-coordinate value by dividing the sum of the X-coordinate values by the number of the sorted grid cells. The AP position estimation apparatus 120 sums Y-coordinate values of the representative coordinates, which are mapped to each sorted grid cell, as many as the number of the sorted grid cells, and calculates an average Y-coordinate value by dividing the sum of the Y-coordinate values by the number of the sorted grid cells. The average X-coordinate value and the average Y-coordinate value are taken and recognized as the total average coordinate value. The AP position estimation apparatus 120 sorts out a grid cell having maximum signal strength information among the representative signal strengths, and estimates the representative coordinate of the sorted grid cell as the position information of the APs.

Although it has been described that steps S310 to S360 of FIG. 3 are sequentially performed, this is merely an exemplary description about the technical spirit of one or more embodiments of the present disclosure. It is apparent to those skilled in the art that various modifications and changes can be made thereto, without departing from essential characteristics of one embodiment of the present disclosure. For example, the procedure described in FIG. 3 can be changed, and one or more steps of steps S310 to S360 can be performed in parallel. FIG. 3 is not limited to the temporal order.

The method for estimating the AP position by using the wireless LAN radiowave environment maps according to one or more embodiments of the present disclosure, as described above with reference to FIG. 3, may also be embodied as a program on a computer-readable recording medium. The computer-readable recording medium storing the program for realizing the AP position estimation method using the wireless LAN radiowave environment map according to one or more embodiments of the present disclosure may be any data storage device that can store data which can be thereafter read by a computer system. Examples of the computer-readable recording medium include ROMs, RAMs, CD-ROMs, magnetic tapes, floppy disks, optical data storage devices, and carrier waves (such as data transmission through the Internet). The computer-readable recording medium may also be distributed over network coupled computer systems so that computer-readable codes are stored and executed in a distributed fashion. In addition, functional programs, codes, and code segments for accomplishing one embodiment of the present disclosure may be easily construed by programmers skilled in the art to which the present disclosure pertains.

Figure 4:
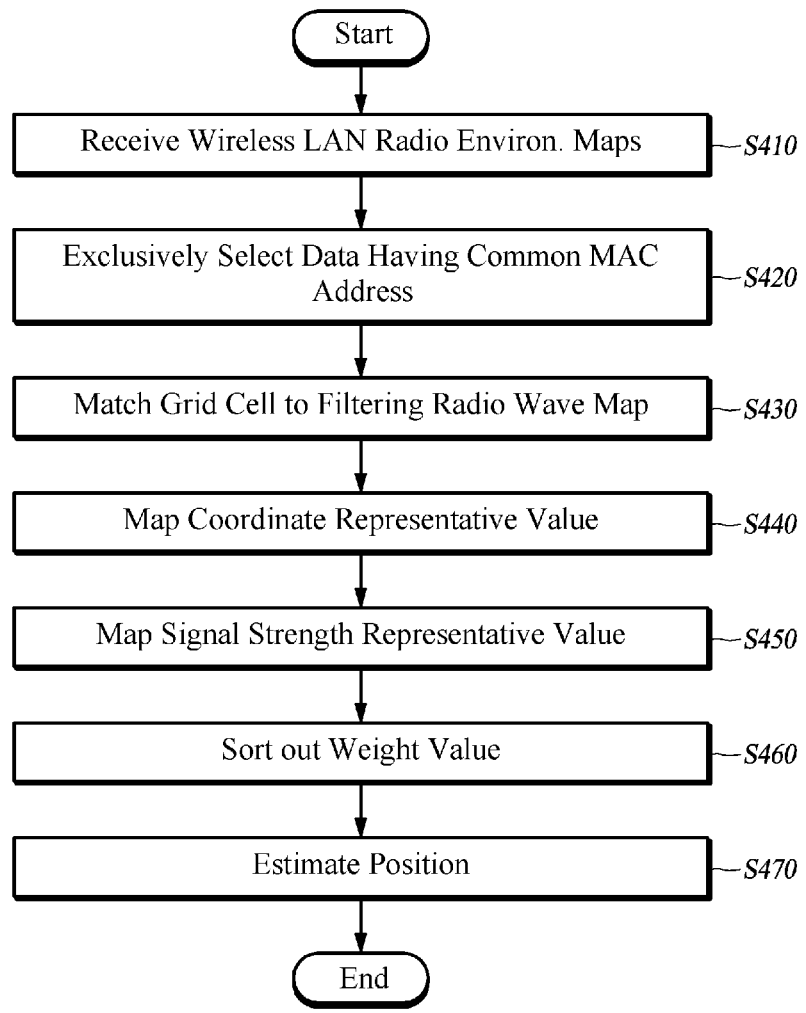
FIG. 4 is a flow chart describing a method for estimating an AP position by using a weighted average of signal strengths according to one or more embodiment of the present disclosure.

FIG. 4 is a flow chart describing a method for estimating an AP position by using a weighted average of signal strengths according to one or more embodiments of the present disclosure.

An AP position estimation apparatus 120 receives wireless LAN radiowave environment maps collected through one or more of a field survey device, a mobile communication terminal, and an external server (step S410). The AP position estimation apparatus 120 generates a filtering radiowave map with data selected exclusively for having a common MAC address from wireless LAN radiowave environment maps collected by a radiowave environment collection apparatus 110 (step S420). The AP position estimation apparatus 120 does not necessarily receive the wireless LAN radiowave environment maps collected by the radiowave environment collection apparatus 110, but may also receive wireless LAN radiowave environment maps collected by an external server. In addition, the wireless LAN radiowave environment maps are one or more of identification information of APs for transmitting/receiving wireless LAN signals, MAC address information, received signal strength indication information, and frequency information which are information of a wireless LAN radiowave environment, after matching with positional information of collecting the wireless LAN radiowave environment.

The AP position estimation apparatus 120 generates a grid radiowave map with arbitrary grid cells from dividing the filtering radiowave map (step S430). The AP position estimation apparatus 120 calculates a centroid of each of the grid cells constituting the grid radiowave map (step S440). The AP position estimation apparatus 120 maps each centroid as a representative coordinate to each of the grid cells constituting the grid radiowave map (step S450). The AP position estimation apparatus 120 calculates representative signal strengths based on data existing in each grid cell constituting the grid radiowave map, and maps each representative signal strength to each grid cell. When the number of the data existing in each grid cell exceeds a preset threshold value, the AP position estimation apparatus 120 calculates a deviation value between maximum signal strength and minimum signal strength among all pieces of signal strength information contained in the data. When the deviation value exceeds a preset strength, the AP position estimation apparatus 120 recognizes an average value of signal strengths, other than the maximum signal strength and the minimum signal strength among all pieces of the signal strength information, as the representative signal strength. When the number of the data existing in each grid cell is two or more, the AP position estimation apparatus 120 recognizes an average value of signal strength information contained in the two data as the representative signal strength. When the number of the data existing in each grid cell is single, the AP position estimation apparatus 120 recognizes signal strength contained in the single data as the representative signal strength.

The AP position estimation apparatus 120 sorts out a weight value corresponding to a range covering received signal strength of the representative signal strength (step S460). The weight value is matched with a preset specific value according to the received signal strength of the representative signal strength. As the received signal strength of the representative signal strength is higher, the preset specific value may have a larger weight value, but the present disclosure is not necessarily limited thereto.

The AP position estimation apparatus 120 estimates AP position information having a common MAC address based on one or more of the representative coordinate, the representative signal strength, and the weight value (step S470). The following detailed description is given about the method of estimating AP position information having a common MAC address, based on one or more of the representative coordinate, the representative signal strength, and the weight value, in the AP position estimation apparatus 120. The AP position estimation apparatus 120 calculates a total weighted average coordinate value by multiplying the weight values by the representative coordinates mapped to each grid cell, and estimates the calculated total weighted average coordinate value as the position information of the APs. That is, the AP position estimation apparatus 120 multiplies X-coordinate values of the representative coordinates by each weight value, sums the products as many as the number of the grid cells, and calculates a weighted average X-coordinate value by dividing the sum of the products by the sum of the weight values. The AP position estimation apparatus 120 multiplies Y-coordinate values of representative coordinates by each weight value, sums the products as many as the number of the grid cells, and calculates a weighted average Y-coordinate value by dividing the sum of the products by the sum of the weight values. The average X-coordinate value and the average Y-coordinate value are taken and recognized as a total weighted average coordinate value.

In addition, the AP position estimation apparatus 120 sorts out the grid cells having signal strength information of the preset threshold value or more among the representative signal strengths, calculates the weighted average coordinate value by multiplying the weight values by the representative coordinates mapped to each sorted grid cell, and estimates the weighted average coordinate value as the position information of the APs. That is, the AP position estimation apparatus 120 multiplies the respective weight values by each representative coordinate mapped to each sorted grid cell, sums the products as many as the number of the sorted grid cells, and calculates a weighted average X-coordinate value by dividing the sum of the products by the sum of the weight values corresponding to the sorted grid cells. The AP position estimation apparatus 120 multiplies the respective weight values by each representative coordinate mapped to each sorted grid cell, sums the products as many as the number of the sorted grid cells, and calculates a weighted average Y-coordinate value by dividing the sum of the products by the sum of the weight values corresponding to the sorted grid cells. The weighted average X-coordinate value and the weighted average Y-coordinate value are taken and recognized as the weighted average coordinate value.

Although it has been described that steps S410 to S470 of FIG. 4 are sequentially performed, this is merely an exemplary description about the technical spirit of one embodiment of the present disclosure. It is apparent to those skilled in the art that various modifications and changes can be made thereto, without departing from essential characteristics of one embodiment of the present disclosure. For example, the procedure described in FIG. 4 can be changed, and one or more steps of steps S410 to S470 can be performed in parallel. FIG. 4 is not limited to the temporal order.

The method for estimating the AP position by using the weighted average of the signal strengths according to one or more embodiments of the present disclosure, as described above with reference to FIG. 4, may also be embodied as a program on a computer-readable recording medium. The computer-readable recording medium storing the program for realizing the method for estimating the AP position by using the weighted average of the signal strengths according to one or more embodiments of the present disclosure may be any data storage device that can store data which can be thereafter read by a computer system. Examples of the computer-readable recording medium include ROMs, RAMs, CD-ROMs, magnetic tapes, floppy disks, optical data storage devices, and carrier waves (such as data transmission through the Internet). The computer-readable recording medium may also be distributed over network coupled computer systems so that computer-readable codes are stored and executed in a distributed fashion. In addition, functional programs, codes, and code segments for accomplishing one embodiment of the present disclosure may be easily construed by programmers skilled in the art to which the present disclosure pertains.

Figure 5:
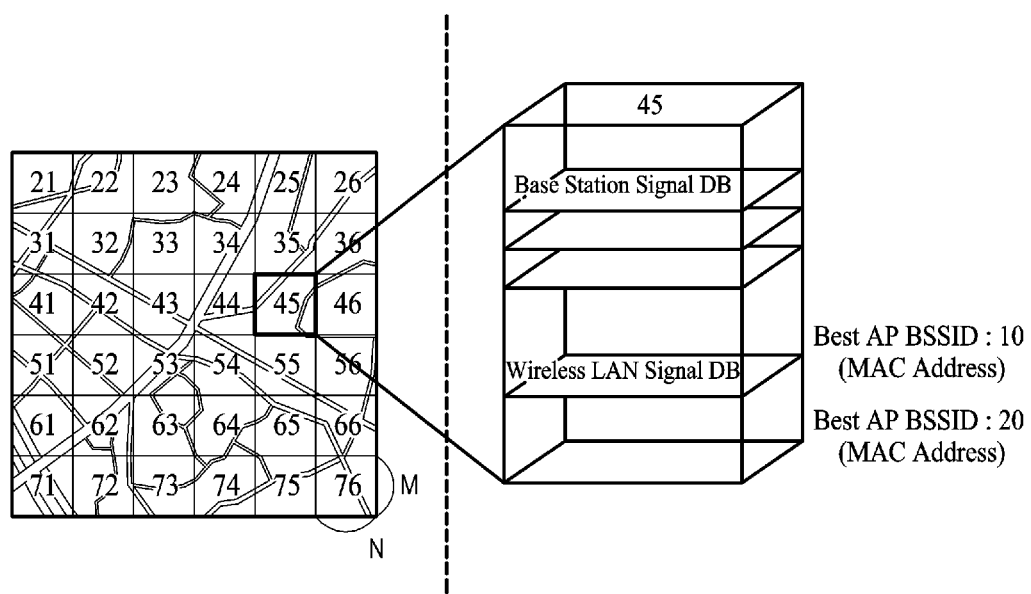
FIG. 5 is a block diagram showing a database according to one or more embodiments of the present disclosure.

FIG. 5 is a block diagram showing a database according to one or more embodiments of the present disclosure.

The database 130 shown in FIG. 5 is established as a database in which the filtering radiowave map is divided by units of grid cells having a preset size, and wireless LAN radiowave environments collected based on each grid cell are stored. The grid cells shown in FIG. 5 are provided by dividing a specific area in a preset size. That is, the grid cell may be set to an N×M size. For example, the grid cell may be set in a square form, such as 100×100, 50×50, 30×30, 25×25, 20×20, 10×10, 5×5, and 1×1, but the present disclosure is not necessarily limited thereto. The grid cell may be set in various forms suitable for each environment through a subsequent optimization process.

In addition, as shown in FIG. 5, the database 130 matchingly stores identification information of APs transmitting/receiving wireless LAN signals to/from each grid cell, MAC address information, received signal strength information, frequency information, and AP position estimation information. It is apparent that when one or more of latitude information, longitude information, and altitude information, which are accurate position information about the installation position of the APs, are obtained through the external server, the database 130 can also update the AP position estimation information with the accurate position information about the installation position of the AP.

The database 130 refers to a general data structure implemented in a storage space (hard disk or memory) of a computer system using a database management program (DBMS). The database 130 refers to a type of data storage that can freely search (extract), delete, edit, and add data. The database 130 may be implemented to achieve the object of one embodiment of the present disclosure by using a relational database management system (RDBMS), such as Oracle, Infomix, Sybase, and DB2, an object-oriented database management system (OODBMS), such as Gemston, Orion, and O2, and an XML native database, such as Excelon, Tamino, and Sekaiju. The database 130 includes appropriate fields or elements so as to achieve its own function.

Figure 6:
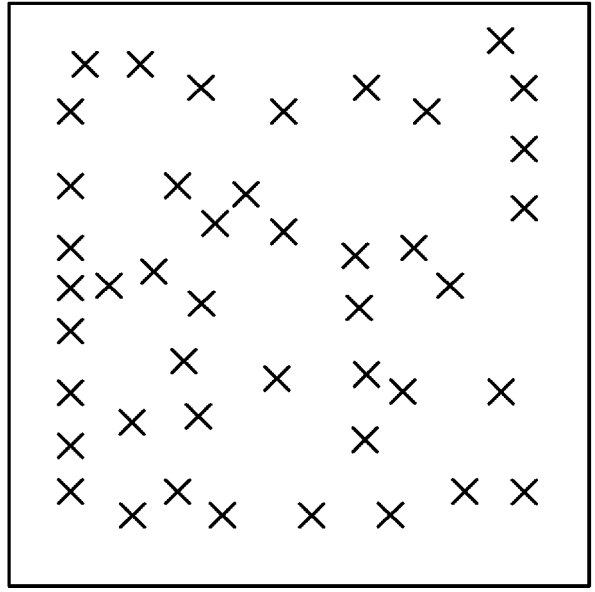
FIG. 6 is an exemplary diagram of a filtering radiowave map and a grid radiowave map according to one or more embodiments of the present disclosure.

FIG. 6 is an exemplary diagram of the filtering radiowave map and the grid radiowave map according to one or more embodiments of the present disclosure.

As shown in FIG. 6A, the AP position estimation apparatus 120 generates the filtering radiowave map with data selected exclusively for having the common MAC address from the wireless LAN radiowave environment maps collected by the radiowave environment collection apparatus 110. That is, the AP position estimation apparatus 120 receives the wireless LAN radiowave environment maps collected through one or more of a field survey device, a mobile communication terminal, and an external server, exclusively sorts out data having the common MAC address, and generates the filtering radiowave map as shown in FIG. 6A. In the filtering radiowave map shown in FIG. 6A, the mark 'X' represents data having the common MAC address, and the wireless LAN radiowave environment information and the position information about the position at which the corresponding radiowave is collected are matchingly stored. The wireless LAN radiowave environment information contains one or more of identification information of the APs transmitting/receiving the wireless LAN signals, MAC address information, received signal strength information, and frequency information.

Meanwhile, as shown in FIG. 6B, the AP position estimation apparatus 120 generates the grid radiowave map with arbitrary grid cells from dividing the filtering radiowave map. That is, when the position information is contained in the filtering radiowave map, which is divided into the grid cells, as shown in FIG. 6B, one or more marks 'X' representing the data having the common MAC address may be contained in the grid cells, or no marks 'X' may be contained in the grid cells.

Figure 7:
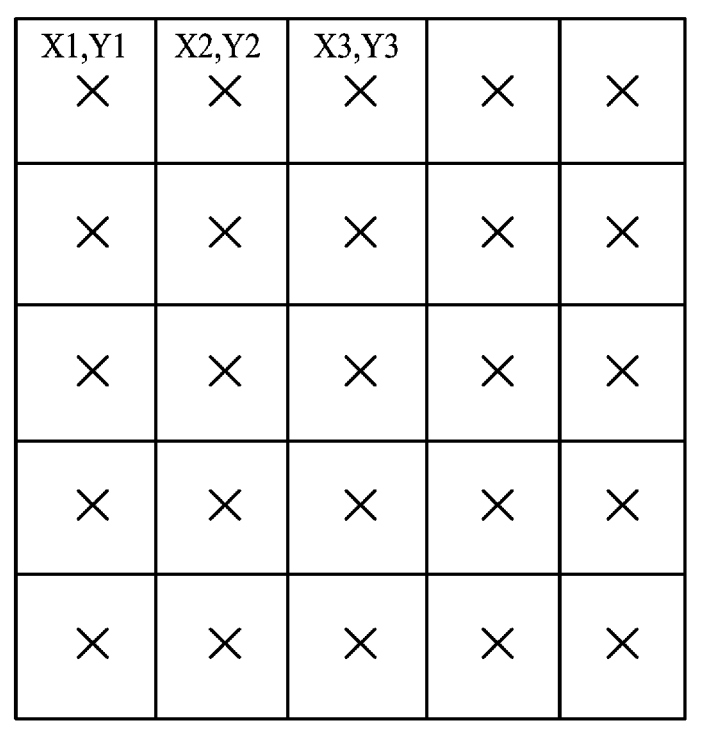

FIG. 7 is an exemplary diagram showing the process of mapping the representative coordinate to the grid radiowave map according to one or more embodiments of the present disclosure.

As marked in FIG. 7, the AP position estimation apparatus 120 calculates a centroid of each of the grid cells constituting the grid radiowave map, and maps each centroid as a representative coordinate to each grid cell constituting the grid radiowave map. That is, since the divided grid cells store the position information containing the latitude information, the longitude information, and the altitude information of each grid cell, the AP position estimation apparatus 120 may calculate the centroid of each grid cell constituting the grid radiowave map by using the position information stored in each grid cell by default. In this case, the centroid may be a center coordinate value of each grid cell.

FIG. 8 is an exemplary diagram showing the process of mapping the representative signal strength to the grid radiowave map according to one or more embodiments of the present disclosure.

As shown in FIG. 8, the AP position estimation apparatus 120 calculates representative signal strengths based on data existing in each grid cell constituting the grid radiowave map, and maps each representative signal strength to each grid cell.

The process of calculating the representative signal strength by the AP position estimation apparatus 120 will be described in more detail. When the number of the data existing in each grid cell exceeds a preset threshold value, the AP position estimation apparatus 120 calculates a deviation value between maximum signal strength and minimum signal strength among all pieces of signal strength information contained in the data. When the deviation value exceeds a preset strength, the AP position estimation apparatus 120 recognizes an average value of signal strengths, other than the maximum signal strength and the minimum signal strength among all pieces of the signal strength information, as the representative signal strength. On the other hand, when the number of the data existing in each grid cell is two or more, the AP position estimation apparatus 120 recognizes an average value of signal strength information contained in the two data as the representative signal strength. Meanwhile, when the number of the data existing in each grid cell is single, the AP position estimation apparatus 120 recognizes a signal strength contained in the single data as the representative signal strength. As described above, when the representative signal strength is mapped, each grid cell constituting the grid radiowave map shown in FIG. 8 contains the position information (centroid coordinate values X and Y) and the representative signal strength.

Figure 9:
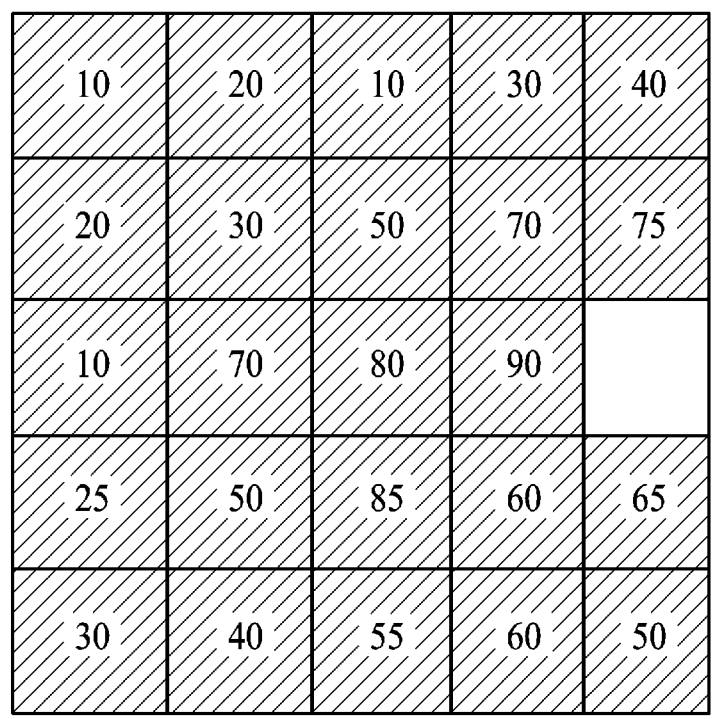
FIG. 9 is an exemplary diagram showing a process of estimating an AP position by using a representative coordinate according to one or more embodiment of the present disclosure.

FIG. 9 is an exemplary diagram showing the process of estimating the AP position by using the representative coordinate according to one or more embodiments of the present disclosure.

As shown in FIG. 9, the AP position estimation apparatus 120 estimates position information of APs having a common MAC address based on the representative coordinate and the representative signal strength.

The following detailed description is given about the method of estimating the position information of the APs having the common MAC address in the AP position estimation apparatus 120. The AP position estimation apparatus 120 calculates a total average coordinate value of the representative coordinates mapped to each grid cell, and estimates the total average coordinate value as the position information of the APs. That is, the AP position estimation apparatus 120 sums X-coordinate values of the representative coordinates as many as the number of the grid cells, and calculates an average X-coordinate value by dividing the sum of the X-coordinate values by the number of the grid cells. The AP position estimation apparatus 120 sums Y-coordinate values of the representative coordinates as many as the number of the grid cells, and calculates an average Y-coordinate value by dividing the sum of the Y-coordinate values by the number of the grid cells. The average X-coordinate value and the average Y-coordinate value are taken and recognized as the total average coordinate value.

For example, as shown in FIG. 9, if the grid cells containing the data having the common MAC address are shaded in the grid radiowave map, it can be seen that twenty-four grid cells contain the data having the common MAC address, and one grid cell does not contain the data having the common MAC address. Therefore, the AP position estimation apparatus 120 calculates a total average coordinate value of the representative coordinates mapped to each shaded grid cell, and estimates the total average coordinate value as the AP position information.

That is, the AP position estimation apparatus 120 sums X-coordinate values of the representative coordinates, which are mapped to each shaded grid cell, as many as the number of the grid cells, and calculates an average X-coordinate value by dividing the sum of the X-coordinate values by the number of the grid cells. The AP position estimation apparatus 120 sums Y-coordinate values of the representative coordinates, which are mapped to each shaded grid cell, as many as the number of the grid cells, and calculates an average Y-coordinate value by dividing the sum of the Y-coordinate values by the number of the grid cells. This is expressed as Equation 1 above. In this case, n may be equal to 24, which represents the number of the grid cells containing the data having the common MAC address.

FIG. 10 is an exemplary diagram showing the process of estimating the AP position by using the representative signal strength according to one or more embodiments of the present disclosure.

As shown in FIG. 10, the AP position estimation apparatus 120 sorts out the grid cells having signal strength information of the preset threshold value or more among the representative signal strengths, calculates the average coordinate value of the representative coordinates mapped to each sorted grid cell, and estimates the average coordinate value as the position information of the APs. That is, the AP position estimation apparatus 120 sums X-coordinate values of the representative coordinates, which are mapped to each sorted grid cell, as many as the number of the sorted grid cells, and calculates an average X-coordinate value by dividing the sum of the X-coordinate values by the number of the sorted grid cells. The AP position estimation apparatus 120 sums Y-coordinate values of the representative coordinates, which are mapped to each sorted grid cell, as many as the number of the sorted grid cells, and calculates an average Y-coordinate value by dividing the sum of the Y-coordinate values by the number of the sorted grid cells. The average X-coordinate value and the average Y-coordinate value are taken and recognized as the total average coordinate value.

For example, as shown in FIG. 10, if the grid cells containing the signal strength information, whose preset threshold value is '60' or more, are sorted out and shaded among the representative signal strengths, it can be seen that nine grid cells contain the signal strength information of '60' or more. Therefore, the AP position estimation apparatus 120 calculates an average coordinate value of the representative coordinates mapped to the nine shaded grid cells, and estimates the average coordinate value as the position information of the APs.

That is, the AP position estimation apparatus 120 sums X-coordinate values of the representative coordinates, which are mapped to each shaded grid cell, as many as the number of the sorted grid cells, and calculates an average X-coordinate value by dividing the sum of the X-coordinate values by the number of the grid cells. The AP position estimation apparatus 120 sums Y-coordinate values of the representative coordinates, which are mapped to each sorted grid cell, as many as the number of the sorted grid cells, and calculates an average Y-coordinate value by dividing the sum of the Y-coordinate values by the number of the grid cells. This is expressed as Equation 1 above. In this case, n will be equal to 9, which represents the number of the grid cells having the signal strength information of the threshold value or more.

FIG. 11 is an exemplary diagram showing the process of estimating the AP position by using the maximum signal strength according to one or more embodiments of the present disclosure.

As shown in FIG. 11, the AP position estimation apparatus 120 sorts out the grid cell having maximum signal strength information among the representative signal strengths, and estimates the representative coordinate of the sorted grid cell as the position information of the AP. For example, after the signal strength information mapped to each grid cell constituting the grid radiowave map is checked, the representative coordinate of the grid cell having the maximum signal strength information is estimated as the AP position. As shown in FIG. 11, since the maximum signal strength among the twenty-five grid cells is '90', the representative coordinate of the grid cell having the signal strength of '90' may be estimated as the AP position information.

Meanwhile, the grid radiowave map and the grid cell shown in FIGS. 6 to 11 may be formed in various sizes, and contain latitude information and longitude information about the centroid of the grid cells.

FIG. 12 is an exemplary diagram showing mapping the representative coordinate to the grid radiowave map according to one or more embodiments of the present disclosure.

As shown in FIG. 12, the AP position estimation apparatus 120 calculates centroid of the respective grid cells constituting the grid radiowave map, and maps each centroid as a representative coordinate to each grid cell constituting the grid radiowave map. That is, since each grid cell stores the position information containing the latitude information and the longitude information of each grid cell, the AP position estimation apparatus 120 may calculate the centroid of each grid cell constituting the grid radiowave map by using the position information stored in each grid cell by default. In this case, the centroid may be the center coordinate value of each grid cell.

FIG. 13 is an exemplary diagram showing the process of mapping the representative signal strength to the grid radiowave map according to one or more embodiments of the present disclosure.

As shown in FIG. 13, the AP position estimation apparatus 120 calculates representative signal strengths based on data existing in each grid cell constituting the grid radiowave map, and maps each representative signal strength to each grid cell. The process of calculating the representative signal strength in the AP position estimation apparatus 120 will be described in more detail. When the number of the data existing in each grid cell exceeds a preset threshold value, the AP position estimation apparatus 120 calculates a deviation value between maximum signal strength and minimum signal strength among all pieces of signal strength information contained in the data. When the deviation value exceeds a preset strength, the AP position estimation apparatus 120 recognizes an average value of signal strengths, other than the maximum signal strength and the minimum signal strength among all pieces of the signal strength information, as the representative signal strength. On the other hand, when the number of the data existing in each grid cell is two or more, the AP position estimation apparatus 120 recognizes an average value of signal strength information contained in the two data as the representative signal strength. Meanwhile, when the number of the data existing in each grid cell is single, the AP position estimation apparatus 120 recognizes signal strength contained in the single data as the representative signal strength. As described above, when the representative signal strength is mapped, each grid cell constituting the grid radiowave map shown in FIG. 13 contains the position information (X and Y values representing centroid coordinate values) and the representative signal strength.

FIG. 14 is an exemplary diagram showing the weight value corresponding to the range covering the received signal strength according to one or more embodiments of the present disclosure.

The AP position estimation apparatus 120 sorts out the weight value corresponding to the range covering the received signal strength of the representative signal strength. The weight value is matched with a preset specific value according to the received signal strength of the representative signal strength. As the received signal strength of the representative signal strength is higher, the preset specific value may have a larger weight value, but the present disclosure is not necessarily limited thereto. In this case, the weight value corresponding to the range covering the received signal strength of the representative signal strength is given as shown in FIG. 14. Although the actual received signal strength is −00 dBm, the received signal strength is represented by numbers 10 to 90 for convenience of description.

For example, specifically, when the received signal strength is 10 to 19, the preset weight value is W1. For the received signal strength of 20 to 29, the preset weight value W2. From 30 to 39, W3. From 40 to 49, W4. From 50 to 59, W5. From 60 to 69, W6. From 70 to 79, W7. From 80 to 89, W8. From 90 to 99, W9.

Figure 15:
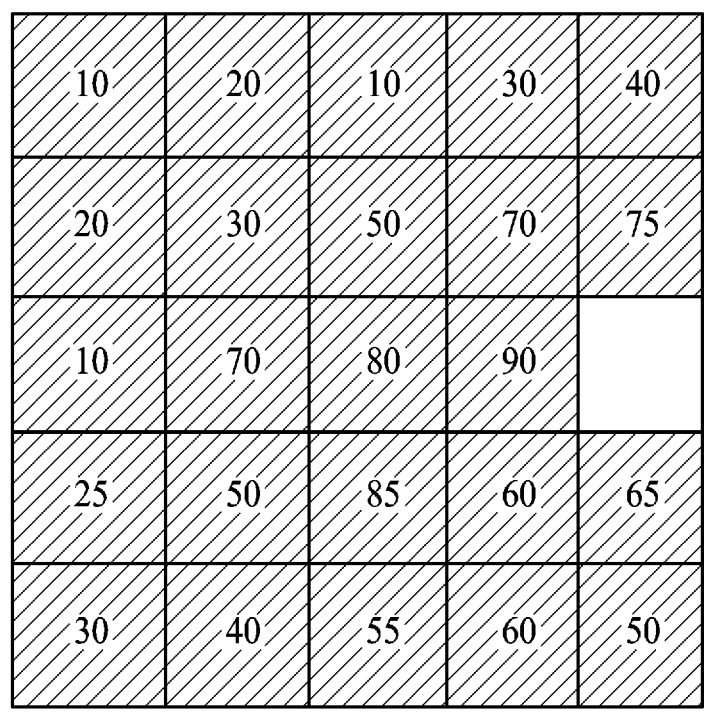
FIG. 15 is an exemplary diagram showing a method for estimating an AP position by applying a weight value to a representative coordinate according to one or more embodiments of the present disclosure.

FIG. 15 is an exemplary diagram showing a method for estimating an AP position by applying a weight value to a representative coordinate according to one or more embodiments of the present disclosure.

As shown in FIG. 15, the AP position estimation apparatus 120 estimates position information of APs having a common MAC address based on one or more of the representative coordinate, the representative signal strength, and the weight value. The following detailed description is given about the method of estimating the position information of the APs having the common MAC address in the AP position estimation apparatus 120. The AP position estimation apparatus 120 sorts out the weight value corresponding to the range covering the received signal strength of the representative signal strength. The weight value is matched with a preset specific value according to the received signal strength of the representative signal strength. As the received signal strength of the representative signal strength is higher, the preset specific value may have a larger weight value, but the present disclosure is not necessarily limited thereto. The AP position estimation apparatus 120 calculates a total weighted average coordinate value by multiplying the weight values by the representative coordinates mapped to each grid cell, and estimates the calculated total weighted average coordinate value as the position information of the APs. The AP position estimation apparatus 120 multiplies X-coordinate values of the representative coordinates by each weight value, sums the products as many as the number of the grid cells, and calculates a weighted average X-coordinate value by dividing the sum of the products by the sum of the weight values. The AP position estimation apparatus 120 multiplies Y-coordinate values of the representative coordinates by each weight value, sums the products as many as the number of the grid cells, and calculates a weighted average Y-coordinate value by dividing the sum of the products by the sum of the weight values. The average X-coordinate value and the average Y-coordinate value are taken and recognized as a total weighted average coordinate value.

For example, as shown in FIG. 15, if the grid cells containing the data having the common MAC address are shaded in the grid radiowave map, it can be seen that twenty-four grid cells contain the data having the common MAC address, and one grid cell does not contain the data having the common MAC address. Therefore, the AP position estimation apparatus 120 calculates a total weighted average coordinate value of the representative coordinates mapped to each shaded grid cell, and estimates the total weighted average coordinate value as the position information of the APs.

That is, the AP position estimation apparatus 120 multiplies X-coordinate values of the representative coordinates, which are mapped to each shaded grid cell, by each weight value, sums the products as many as the number of the grid cells, and calculates a weighted average X-coordinate value by dividing the sum of the products by the sum of the weight values. The AP position estimation apparatus 120 multiplies Y-coordinate values of the representative coordinates by each weight value, sums the products as many as the number of the grid cells, and calculates a weighted average Y-coordinate value by dividing the sum of the products by the sum of the weight values.

More specifically, among the grid cells (X1, Y1) to (X25, Y25), the coordinate values of the grid cells (X1, Y1) to (X14, Y14), and (X16, Y16) to (X25, Y25) other than the empty grid cell (X15, Y15) have the representative signal strengths of '10', '20', '25', '30', '40', '50', '55', '60', '65', '70', '75', '80', '85', and '90', respectively. Therefore, it is possible to sort out the weigh value 'W1' corresponding to the representative signal strength of '10', the weigh value 'W2' corresponding to the representative signal strengths of '20' and '25', the weigh value 'W3' corresponding to the representative signal strength of '30', the weigh value 'W4' corresponding to the representative signal strength of '40', the weigh value 'W5' corresponding to the representative signal strengths of '50' and '55', the weigh value 'W6' corresponding to the representative signal strengths of '60' and '65', the weigh value 'W7' corresponding to the representative signal strengths of '70' and '75', the weigh value 'W8' corresponding to the representative signal strengths of '80' and '85', and the weigh value 'W9' corresponding to the representative signal strength of '90'. In the following description, it is assumed that the weight values corresponding to the ranges covering the received signal strengths of the representative signal strengths of the grid cells (X1, Y1) to (X25, Y25) are R1 to R25.

That is, since the representative signal strength of X1 is '10', the weight value 'W1' may be input to 'R1'. Since the representative signal strength of X2 is '20', the weight value 'W2' may be input to 'R2'. Since the representative signal strength of X3 is '10', the weight value 'W1' may be input to 'R3'. Since the representative signal strength of X4 is '30', the weight value 'W3' may be input to 'R4'. If calculated using the above-described method, the X-coordinate value is expressed as '(X1×R1+ . . . +X14×R14+X16×R16+ . . . +X25×R25)/(R1+ . . . +R14+R16+ . . . +R25)'. On the other hand, if calculated by using the above-described method, the Y-coordinate value is expressed as '(Y1×R1+ . . . +Y14×R14+Y16×R16+ . . . +Y25×R25)/(R1+ . . . +R14+R16+ . . . +R25)'.

FIG. 16 is an exemplary diagram showing a method for estimating an AP position by applying a weight value to a sorted representative signal strength according to one or more embodiments of the present disclosure.

As shown in FIG. 16, the AP position estimation apparatus 120 sorts out the grid cells having signal strength information of the preset threshold value or more among the representative signal strengths, calculates the weighted average coordinate value by multiplying the weight values by the representative coordinates mapped to each sorted grid cell, and estimates the weighted average coordinate value as the position information of the APs. The AP position estimation apparatus 120 multiplies the respective representative coordinates, which are mapped to each sorted grid cell, by each weight value, sums the products as many as the number of the sorted grid cells, and calculates a weighted average X-coordinate value by dividing the sum of the products by the sum of the weight values corresponding to the sorted grid cells. The AP position estimation apparatus 120 multiplies the respective representative coordinates, which are mapped to each sorted grid cell, by each weight value, sums the products as many as the number of the sorted grid cells, and calculates a weighted average Y-coordinate value by dividing the sum of the products by the sum of the weight values corresponding to the sorted grid cells. The weighted average X-coordinate value and the weighted average Y-coordinate value are taken and recognized as a weighted average coordinate value.

For example, as shown in FIG. 16, if the grid cells containing the signal strength information, whose preset threshold value is "60" or more, are sorted out and shaded among the representative signal strengths, it can be seen that nine grid cells contain the signal strength information of "60" or more. Therefore, the AP position estimation apparatus 120 calculates the weighted average coordinate value of the representative coordinates mapped to the nine shaded grid cells, and estimates the weighted average coordinate value as the position information of the APs.

That is, it can be seen that the grid cells having the signal strength information, whose preset threshold value is '60' or more, among the representative signal strengths are (X9,Y9), (X10,Y10), (X12,Y12), (X13,Y13), (X14,Y14), (X18,Y18), (X19, Y19), (X20, Y20), and (X24, Y24). In this case, the weighted average X-coordinate value is calculated by multiplying the respective weight values by the representative coordinates mapped to each sorted grid cell, summing the products as many as the number of the sorted grid cells, and dividing the sum of the products by the sum of the weight values corresponding to the sorted grid cells. More specifically, the X-coordinate values of the grid cells (X9,Y9), (X10, Y10), (X12, Y12), (X13, Y13), (X14, Y14), (X18, Y18), (X19, Y19), (X20, Y20), and (X24, Y24) are expressed as '(X9×R9+X10×R10+X12×R12+X13×R13+X14×R14+ X18×R18+X19×R19+X20×R20+X24×R24)/(R9+R10+ R12+R13+R14+R18+R19+R20+R24)'.

On the other hand, the weighted average Y-coordinate value is calculated by multiplying the respective weight values by the representative coordinates mapped to each sorted grid cell, summing the products as many as the number of the sorted grid cells, and dividing the sum of the products by the sum of the weight values corresponding to the sorted grid cells. More specifically, the X-coordinate values of the grid cells (X9, Y9), (X10, Y10), (X12, Y12), (X13, Y13), (X14, Y14), (X18, Y18), (X19, Y19), (X20, Y20), and (X24, Y24) are expressed as '(Y9×R9+Y10×R10+Y12×R12+Y13× R13+Y14×R14+Y18×R18+Y19×R19+Y20×R20+Y24× R24)/(R9+R10+R12+R13+R14+R18+R19+R20+R24)'.

Meanwhile, the grid radiowave maps and the grid cells shown in FIGS. 6 to 13, 15 and 16 may be formed in various sizes, and have contain latitude information and longitude information about the centroid of the grid cells.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields of estimating an AP position to enable the establishment of a database that contains position estimation information of APs transmitting/receiving wireless LAN signals so as to determine positions by using the wireless LAN signals.

CROSS-REFERENCE TO RELATED APPLICATION

If applicable, this application claims priorities under 35 U.S.C. §119(a) of Patent Application No. 10-2010-0065806, filed on Jul. 8, 2010 and Patent Application No. 10-2010-0080090, filed on Aug. 19, 2010 in Korea, the entire contents of which are incorporated herein by reference. In addition, this non-provisional application claims priorities in countries, other than the U.S., with the same reason based on the Korean Patent Applications, the entire contents of which are hereby incorporated by reference.

The invention claimed is:

1. An apparatus for estimating an AP position by using a weighted average of signal strengths, comprising:
 a filtering unit for generating a filtering radiowave map with data selected exclusively for having a common MAC address from collected wireless LAN radiowave environment maps;
 a grid cell division unit for generating a grid radiowave map with arbitrary grid cells from dividing the filtering radiowave map;
 a representative coordinate mapping unit for calculating a centroid of each of the grid cells constituting the grid radiowave map, and mapping said each centroid as a representative coordinate to said each grid cell;
 a representative signal strength mapping unit for calculating representative signal strengths based on data existing in said each grid cell, and mapping each representative signal strength to said each grid cell;

a weight value sorting unit for sorting out a weight value corresponding to a range covering a received signal strength of the representative signal strength; and a position estimation unit for estimating positional information of access points (APs) having a common MAC address based on one or more of the representative coordinate, the representative signal strength, and the weight value.

2. The apparatus of claim 1, wherein the position estimation unit calculates a total weighted average coordinate value by multiplying the weight value by the representative coordinate mapped to each grid cell, and estimates the total weighted average coordinate value as the position information of the APs.

3. The apparatus of claim 2, wherein the position estimation unit multiplies an X-coordinate value of each representative coordinate by each weight value, sums products of multiplications as many as the number of the grid cells, and calculates a weighted average X-coordinate value by dividing the sum of the products by the sum of the weight values;

the position estimation unit multiplies an Y-coordinate value of each representative coordinate by each weight value, sums products of multiplications as many as the number of the grid cells, and calculates a weighted average Y-coordinate value by dividing the sum of the products by the sum of the weight values; and wherein the average X-coordinate value and the average Y-coordinate value are taken and recognized as the total weighted average coordinate value.

4. The apparatus of claim 1, further comprising a grid cell sorting unit for sorting out grid cells having signal strength information of a preset threshold value or more among the representative signal strengths, wherein the position estimation unit calculates a weighted average coordinate value by multiplying each weight value by each representative coordinate mapped to said each grid cell, and estimates the weighted average coordinate value as the position information of the APs.

5. The apparatus of claim 4, wherein the position estimation unit multiplies said each weight value by said each representative coordinate mapped to each sorted grid cell, sums products of multiplications as many as the number of the sorted grid cells, and calculates a weighted average X-coordinate value by dividing the sum of the products by the sum of the weight values corresponding to the sorted grid cells;

the position estimation unit multiplies said each weight values by said each representative coordinate mapped to said each sorted grid cell, sums products of multiplications as many as the number of the sorted grid cells, and calculates a weighted average Y-coordinate value by dividing the sum of the products by the sum of the weight values corresponding to the sorted grid cells; and wherein the weighted average X-coordinate value and the weighted average Y-coordinate value are taken and recognized as a weighted average coordinate value.

6. The apparatus of claim 1, wherein the weight value is matched with a preset specific value according to the received signal strength of the representative signal strength, and as the received signal strength of the representative signal strength is higher, the preset specific value has a larger weight value.

7. The apparatus of claim 1, wherein when the number of the data existing in said each grid cell exceeds a preset threshold value, the representative signal strength mapping unit calculates a deviation value between maximum signal strength and minimum signal strength among all pieces of signal strength information contained in the data; and when the deviation value exceeds a preset strength, the representative signal strength mapping unit recognizes an average value of signal strengths, other than the maximum signal strength and the minimum signal strength among all pieces of the signal strength information, as the representative signal strength.

8. The apparatus of claim 1, wherein when the number of the data existing said each grid cell is two or more, the representative signal strength mapping unit recognizes an average value of signal strength information contained in the two data as the representative signal strength.

9. The apparatus of claim 1, wherein when the number of the data existing in said each grid cell is single, the representative signal strength mapping unit recognizes signal strength contained in the single data as the representative signal strength.

10. The apparatus of claim 1, wherein the wireless LAN radiowave environment maps are one or more of identification information (SSID) of access points for transmitting/receiving wireless LAN signals, MAC address information (BSSID), received signal strength indication information (RSSI) and frequency information (channel) which are information of a wireless LAN radiowave environment, after matching with positional information of collecting the wireless LAN radiowave environment.

11. The apparatus of claim 1, further comprising a wireless LAN radiowave environment reception unit for receiving the wireless LAN radiowave environment maps collected through one or more of a field survey device, a mobile communication terminal, and an external server.

12. An apparatus for estimating an AP position by using a weighted average of signal strengths, comprising:

a filtering unit for generating a filtering radiowave map with data selected exclusively for having a common MAC address from collected wireless LAN radiowave environment maps;

a grid cell division unit for generating a grid radiowave map with arbitrary grid cells from dividing the filtering radiowave map;

a representative coordinate mapping unit for calculating a centroid of each of the grid cells constituting the grid radiowave map, and mapping said each centroid as a representative coordinate to said each grid cell;

a representative signal strength mapping unit for calculating representative signal strengths based on data existing in said each grid cell, and mapping each representative signal strength to said each grid cell;

a weight value sorting unit for sorting out a weight value corresponding to a range covering a received signal strength of the representative signal strength; and a position estimation unit for calculating a total weighted average coordinate value by multiplying the weight value by the representative coordinate mapped to each grid cell, and estimating the weighted average coordinate value as position information of APs having a common MAC address.

13. An apparatus for estimating an AP position by using a weighted average of signal strengths, comprising:

a filtering unit for generating a filtering radiowave map with data selected exclusively for having a common MAC address from collected wireless LAN radiowave environment maps;

a grid cell division unit for generating a grid radiowave map with arbitrary grid cells from dividing the filtering radiowave map;

a representative coordinate mapping unit for calculating a centroid of each of the grid cells constituting the grid radiowave map, and mapping said each centroid as a representative coordinate to said each grid cell;

a representative signal strength mapping unit for calculating representative signal strengths based on data existing in said each grid cell, and mapping each representative signal strength to said each grid cell;

a weight value sorting unit for sorting out a weight value corresponding to a range covering a received signal strength of the representative signal strength;

a grid cell sorting unit for sorting out a grid cells having signal strength information of a preset threshold value or more among the representative signal strengths; and a position estimation unit for calculating a weighted average coordinate value by applying the weight value to the representative coordinate mapped to said each grid cell, and estimating the weighted average coordinate value as position information of APs having the common MAC address.

14. A method for estimating an AP position by using a weighted average of signal strengths, comprising:

generating a filtering radiowave map with data selected exclusively for having a common MAC address from collected wireless LAN radiowave environment maps;

generating a grid radiowave map with arbitrary grid cells from dividing the filtering radiowave map;

calculating a centroid of each of the grid cells constituting the grid radiowave map, and mapping said each centroid as a representative coordinate to said each grid cell;

calculating representative signal strengths based on data existing in said each grid cell, and mapping each representative signal strength to said each grid cell;

sorting out a weight value corresponding to a range covering a received signal strength of the representative signal strength; and estimating position information of APs having a common MAC address, based on one or more of the representative coordinate, the representative signal strength, and the weight value.

15. The method of claim 14, wherein the step of estimating the position information comprises calculating a total weighted average coordinate value by multiplying each weight value by each representative coordinate mapped to said each grid cell, and estimating the total weighted average coordinate value as the position information of the APs having the common MAC address.

16. The method of claim 14, further comprising sorting out grid cells having signal strength information of a preset threshold value or more among the representative signal strengths, wherein the step of estimating the position information comprises calculating a weighted average coordinate value by multiplying said each weight value by said each representative coordinate mapped to said each grid cell, and estimating the weighted average coordinate value as the position information of the APs.

17. A computer readable medium storing a computer program for causing, when executed in a processor, the processor to perform the steps of a method for estimating an AP position by using a weighted average of signal strengths, which is claimed in claim 14.

18. A method for estimating an AP position by using a weighted average of signal strengths, comprising:

generating a filtering radiowave map with data selected exclusively for having a common MAC address from collected wireless LAN radiowave environment maps;

generating a grid radiowave map with arbitrary grid cells from dividing the filtering radiowave map;

calculating a centroid of each of the grid cells constituting the grid radiowave map, and mapping said each centroid as a representative coordinate to said each grid cell;

calculating representative signal strengths based on data existing in said each grid cell, and mapping each representative signal strength to said each grid cell;

sorting out a weight value corresponding to a range covering a received signal strength of the representative signal strength; and calculating a total weighted average coordinate value by multiplying each weight value by each representative coordinate mapped to said each grid cell, and estimating the total weighted average coordinate value as position information of APs having a common MAC address.

19. A method for estimating an AP position by using a weighted average of signal strengths, comprising:

generating a filtering radiowave map with data selected exclusively for having a common MAC address from collected wireless LAN radiowave environment maps;

generating a grid radiowave map with arbitrary grid cells from dividing the filtering radiowave map;

calculating a centroid of each of the grid cells constituting the grid radiowave map, and mapping said each centroid as a representative coordinate to said each grid cell;

calculating representative signal strengths based on data existing in said each grid cell, and mapping each representative signal strength to said each grid cell;

sorting out a weight value corresponding to a range covering a received signal strength of the representative signal strength;

sorting out the grid cells having signal strength information of a preset threshold value or more among the representative signal strengths, and calculating a weighted average coordinate value by applying each weight value to each representative coordinate mapped to said each grid cell, and estimating the weighted average coordinate value as position information of APs having the common MAC address.

20. An apparatus for estimating an AP position by using wireless LAN radiowave environment maps, comprising:

a filtering unit for generating a filtering radiowave map with data selected exclusively for having a common MAC address from collected wireless LAN radiowave environment maps;

a grid cell division unit for generating a grid radiowave map with arbitrary grid cells from dividing the filtering radiowave map;

a representative coordinate mapping unit for calculating a centroid of each of the grid cells constituting the grid radiowave map, and mapping said each centroid as a representative coordinate to said each grid cell;

a representative signal strength mapping unit for calculating representative signal strengths based on data existing in said each grid cell, and mapping each representative signal strength to said each grid cell; and a position estimation unit for estimating position information of APs having a common MAC address based on one or more of the representative coordinates and the representative signal strengths.

21. The apparatus of claim 20, wherein the position estimation unit calculates a total weighted average coordinate value of the representative coordinates mapped to said each grid cell, and estimates the total weighted average coordinate value as the position information of the APs.

22. The apparatus of claim 21, wherein the position estimation unit sums X-coordinate values of the representative coordinates as many as the number of the grid cells, and calculates an average X-coordinate value by dividing the sum of the X-coordinate values by the number of the grid cells;

the position estimation unit sums Y-coordinate values of the representative coordinates as many as the number of the grid cells, and calculates an average Y-coordinate value by dividing the sum of the Y-coordinate values by the number of the grid cells; and the average X-coordinate value and the average Y-coordinate value are taken and recognized as the total average coordinate value.

23. The apparatus of claim 20, further comprising a grid cell sorting unit for sorting out grid cells having signal strength information of a preset threshold value or more among the representative signal strengths, wherein the position estimation unit calculates an average coordinate value of the representative coordinates mapped to each sorted grid cell, and estimates the average coordinate value as the position information of the APs.

24. The apparatus of claim 23, wherein the position estimation unit sums X-coordinate values of the representative coordinates, which are mapped to each sorted grid cell, as many as the number of the grid cells, and calculates an average X-coordinate value by dividing the sum of the X-coordinate values by the number of the grid cells;

the position estimation unit sums Y-coordinate values of the representative coordinates, which are mapped to each sorted grid cell, as many as the number of the grid cells, and calculates an average Y-coordinate value by dividing the sum of the Y-coordinate values by the number of the grid cells; and the average X-coordinate value and the average Y-coordinate value are taken and recognized as the total average coordinate value.

25. The apparatus of claim 20, wherein the position estimation unit sorts out grid cell having maximum signal strength information among the representative signal strengths, and estimates the representative coordinate of the sorted grid cell as the position information of the APs.

26. The apparatus of claim 20, wherein when the number of the data existing in said each grid cell exceeds a preset threshold value, the representative signal strength mapping unit calculates a deviation value between maximum signal strength and minimum signal strength among all pieces of signal strength information contained in the data; and when the deviation value exceeds a preset strength, the representative signal strength mapping unit recognizes an average value of signal strengths, other than the maximum signal strength and the minimum signal strength among all pieces of the signal strength information, as the representative signal strength.

27. The apparatus of claim 20, wherein when the number of the data existing in each grid cell is two or more, the representative signal strength mapping unit recognizes an average value of signal strength information contained in the two data as the representative signal strength.

28. The apparatus of claim 20, wherein when the number of the data existing in each grid cell is single, the representative signal strength mapping unit recognizes a signal strength contained in the single data as the representative signal strength.

29. The apparatus of claim 20, wherein the wireless LAN radiowave environment maps are one or more of identification information (SSID) of access points for transmitting/receiving wireless LAN signals, MAC address information (BSSID), received signal strength indication information (RSSI), and frequency information (channel) which are information of a wireless LAN radiowave environment, after matching with positional information of collecting the wireless LAN radiowave environment.

30. The apparatus of claim 20, further comprising a wireless LAN radiowave environment reception unit for receiving the wireless LAN radiowave environment maps collected through one or more of a field survey device, a mobile communication terminal, and an external server.

31. An apparatus for estimating an AP position by using wireless LAN radiowave environment maps, comprising:

a filtering unit for generating a filtering radiowave map with data selected exclusively for having a common MAC address from collected wireless LAN radiowave environment maps;

a grid cell division unit for generating a grid radiowave map with arbitrary grid cells from dividing the filtering radiowave map;

a representative coordinate mapping unit for calculating a centroid of each of the grid cells constituting the grid radiowave map, and mapping said each centroid as a representative coordinate to said each grid cell; and a position estimation unit for calculates a total weighted average coordinate value of the representative coordinates mapped to said each grid cell, and estimating the total weighted average coordinate value as the position information of the APs.

32. An apparatus for estimating an AP position by using wireless LAN radiowave environment maps, comprising:

a filtering unit for generating a filtering radiowave map with data selected exclusively for having a common MAC address from collected wireless LAN radiowave environment maps;

a grid cell division unit for generating a grid radiowave map with arbitrary grid cells from dividing the filtering radiowave map;

a representative coordinate mapping unit for calculating a centroid of each of the grid cells constituting the grid radiowave map, and mapping said each centroid as a representative coordinate to said each grid cell;

a representative signal strength mapping unit for calculating representative signal strengths based on data existing in said each grid cell, and mapping each representative signal strength to said each grid cell;

a grid cell sorting unit for sorting out the grid cells having signal strength information of a preset threshold value or more among the representative signal strengths; and a position estimation unit for estimating an average coordinate value of the representative coordinates mapped to each sorted grid cell, and estimating the average coordinate value as the position information of the APs.

33. An apparatus for estimating an AP position by using wireless LAN radiowave environment maps, comprising:

a filtering unit for generating a filtering radiowave map with data selected exclusively for having a common MAC address from collected wireless LAN radiowave environment maps;

a grid cell division unit for generating a grid radiowave map with arbitrary grid cells from dividing the filtering radiowave map;

a representative coordinate mapping unit for calculating a centroid of each of the grid cells constituting the grid radiowave map, and mapping said each centroid as a representative coordinate to said each grid cell;

a representative signal strength mapping unit for calculating representative signal strengths based on data existing in said each grid cell, and mapping each representative signal strength to said each grid cell; and a position estimation unit for sorting out grid cells having maximum signal strength information among the representative signal strengths, and estimating the representative coordinate of the sorted grid cell as the position information of the APs.

34. An apparatus for estimating an AP position by using wireless LAN radiowave environment maps, comprising:
generating a filtering radiowave map with data selected for having a common MAC address from collected wireless LAN radiowave environment maps;
generating a grid radiowave map with arbitrary grid cells from dividing the filtering radiowave map;
calculating a centroid of each of the grid cells constituting the grid radiowave map, and mapping said each centroid as a representative coordinate to said each grid cell;
calculating representative signal strengths based on data existing in said each grid cell, and mapping each representative signal strength to said each grid cell; and
estimating position information of APs having a common MAC address based on one or more of the representative coordinates and the representative signal strengths.

35. A method for estimating an AP position by using wireless LAN radiowave environment maps, comprising:
generating a filtering radiowave map with data selected exclusively for having a common MAC address from collected wireless LAN radiowave environment maps;
generating a grid radiowave map with arbitrary grid cells from dividing the filtering radiowave map;
calculating a centroid of each of the grid cells constituting the grid radiowave map, and mapping said each centroid as a representative coordinate to said each grid cell; and
estimating a total average coordinate value of the representative coordinates mapped to each grid cell, and estimating the total average coordinate value as the position information of the APs.

36. A method for estimating an AP position by using wireless LAN radiowave environment maps, comprising:
generating a filtering radiowave map with data selected exclusively for having a common MAC address from collected wireless LAN radiowave environment maps;
generating a grid radiowave map with arbitrary grid cells from dividing the filtering radiowave map;
calculating a centroid of each of the grid cells constituting the grid radiowave map, and mapping said each centroid as a representative coordinate to said each grid cell;
calculating representative signal strengths based on data existing in said each grid cell, and mapping each representative signal strength to said each grid cell;
sorting out the grid cells having signal strength information of a preset threshold value or more among the representative signal strengths; and
estimating an average coordinate value of the representative coordinates mapped to each sorted grid cell, and estimating the average coordinate value as the position information of the APs.

37. A method for estimating an AP position by using wireless LAN radiowave environment maps, comprising:
generating a filtering radiowave map with data selected exclusively for having a common MAC address from collected wireless LAN radiowave environment maps;
generating a grid radiowave map with arbitrary grid cells from dividing the filtering radiowave map;
calculating a centroid of each of the grid cells constituting the grid radiowave map, and mapping said each centroid as a representative coordinate to said each grid cell;
calculating representative signal strengths based on data existing in said each grid cell, and mapping each representative signal strength to said each grid cell; and
sorting out a grid cell having maximum signal strength information among the representative signal strengths, and estimating a representative coordinate of the sorted grid cell as the position information of the APs.

* * * * *